United States Patent
Barile et al.

(10) Patent No.: US 12,421,035 B1
(45) Date of Patent: Sep. 23, 2025

(54) AUTOMATED SELF-STORAGE SYSTEM

(71) Applicants: Nicholas Anthony Barile, Greenwich, CT (US); Gregory Swyer Frumin, Greenwich, CT (US)

(72) Inventors: Nicholas Anthony Barile, Greenwich, CT (US); Gregory Swyer Frumin, Greenwich, CT (US)

( * ) Notice: Subject to any disclaimer, the term of this patent is extended or adjusted under 35 U.S.C. 154(b) by 0 days.

(21) Appl. No.: 19/080,644

(22) Filed: Mar. 14, 2025

Related U.S. Application Data

(60) Provisional application No. 63/630,970, filed on Mar. 15, 2024.

(51) Int. Cl.
  *B65G 1/04* (2006.01)
  *B65G 1/02* (2006.01)
  *B65G 1/06* (2006.01)
  *B65G 1/137* (2006.01)

(52) U.S. Cl.
  CPC ............ *B65G 1/0478* (2013.01); *B65G 1/02* (2013.01); *B65G 1/026* (2013.01); *B65G 1/0414* (2013.01); *B65G 1/06* (2013.01); *B65G 1/137* (2013.01); *B65G 1/1371* (2013.01); *B65G 2203/0283* (2013.01)

(58) Field of Classification Search
  CPC ........ B65G 1/0478; B65G 1/02; B65G 1/026; B65G 1/0414; B65G 1/06; B65G 1/137; B65G 1/1371; B65G 2203/0283
  See application file for complete search history.

(56) References Cited

U.S. PATENT DOCUMENTS

| | | | | |
|---|---|---|---|---|
| 4,966,513 A | * | 10/1990 | Motoda | B65G 1/02 414/277 |
| 5,190,427 A | * | 3/1993 | Lai | B65G 1/0478 414/239 |
| 5,636,750 A | * | 6/1997 | Heyl | G07F 11/62 312/201 |
| 5,946,660 A | * | 8/1999 | McCarty | G07F 7/00 705/5 |
| 2010/0121481 A1 | * | 5/2010 | Talley | B65G 1/0407 700/214 |
| 2013/0068638 A1 | * | 3/2013 | Ho | B65G 1/00 206/216 |
| 2020/0354148 A1 | * | 11/2020 | Xue | G06Q 20/18 |
| 2023/0373720 A1 | * | 11/2023 | Cooper | B65G 1/0492 |
| 2024/0166445 A1 | * | 5/2024 | Must | B65G 1/1375 |

* cited by examiner

*Primary Examiner* — Thomas Randazzo

(57) ABSTRACT

An automated self-storage system is a system that provides greater rentable square footage in a cost-effective, efficient, and environmentally friendly manner. The system includes a support frame, storage modules, support tracks, a system controller, and a system power source. The support frame is a large metal structure that supports the automated operation of the system. Each of the storage modules can retain the stored items in an accessible manner. Each of the storage modules can move laterally and/or vertically as necessary for the storage and retrieval of the stored items within. Each of the support tracks provides structural support to the corresponding storage modules so that the storage modules can be stored vertically along the support frame. The system controller enables the automated operation of each of the storage modules, while the system power source provides the electrical power necessary for the automated operation of the storage modules.

20 Claims, 22 Drawing Sheets

AUTOMATED SELF-STORAGE SYSTEM

FIELD OF THE INVENTION

The present invention relates generally to storage systems and automated facilities. More specifically, the present invention discloses a system that facilitates the automated self-storage of various objects.

BACKGROUND OF THE INVENTION

Nowadays, self-storage facilities are widely popular due to the convenience of enabling people to store belongings in rented spaces due to the lack of storage space at home, business, etc. In general, self-storage facilities are built as multi-story facilities that waste valuable floor space and cost significantly more to build. This requires a large initial investment to be made when establishing a new self-storage facility. In addition, self-storage facilities are designed so that people store the belongings by themselves. This requires the appropriate amenities to be built into the self-storage facility such as elevators, stairs, walkways, driveways, etc. These amenities end up taking space from the potential storage space of the facility and raise the operational costs of the facility. A space-saving self-storage system that takes less space to operate and does not require people to move towards the rented storage space is necessary.

Therefore, the objective of the present invention is to provide an automated self-storage system that eliminates the need for large self-storage facilities. The present invention is a cost-saving alternative that eliminates the need for multi-story facilities. The present invention also minimizes the need for environmental controls, extensive lighting, fire alarm systems, and other typical amenities. Further, the present invention increases rentable square footage by maximizing the use of vertical space and by eliminating the constraints of traditional multi-story facilities. Furthermore, the present invention has greater storage efficiency by reducing customer access times to the rented spaces which also reduces labor costs of the system. Additional features and benefits of the present invention are further discussed in the sections below.

SUMMARY OF THE INVENTION

The present invention discloses an automated self-storage system that optimizes the available storage space of large storage facilities. The present invention's system implements a metal structure able to support several storage modules in several storage rows that are vertically stacked along the metal structure. The present invention's system further includes an automated mechanism that efficiently and safely moves the storage modules throughout the metal structure. The automated mechanism of the present invention's system allows lateral and vertical movement of each storage module throughout the metal structure. This way, each of the storage modules can move to the predetermined storage space within the metal structure when not in use and to the designed access space within the metal structure when in use.

In general, the metal structure of the present invention's system includes three or four storage rows with several storage spaces each. The final number of storage rows and the corresponding storage spaces within the metal structure depends on the storage space of the target storage facility. Further, the automated mechanism of the present invention's system implements a method of operation that is engaged by the user via a user-friendly interface. For example, a software application or physical user interface can be implemented through which the user can engage the automated mechanism to access the rented storage module. Further, each storage module is designed to accommodate a storage box of various sizes to cater the diverse needs of customers. Each storage box can be equipped with the necessary security features that allows only authorized users to access the stored items within.

As a result, when a customer approaches the present invention, the customer simply approaches the access space corresponding to the rented storage module. Then, using the provided user interface, the user can engage the automated mechanism which moves the rented storage module from the corresponding storage space within the metal structure towards the access space. In other embodiments, the present invention can be implemented for other applications that require automate management of storage space including, but not limited to, warehouses, hydroponics facilities, and other systems that require vertical storage.

DETAIL DESCRIPTIONS OF THE INVENTION

Figure 1:
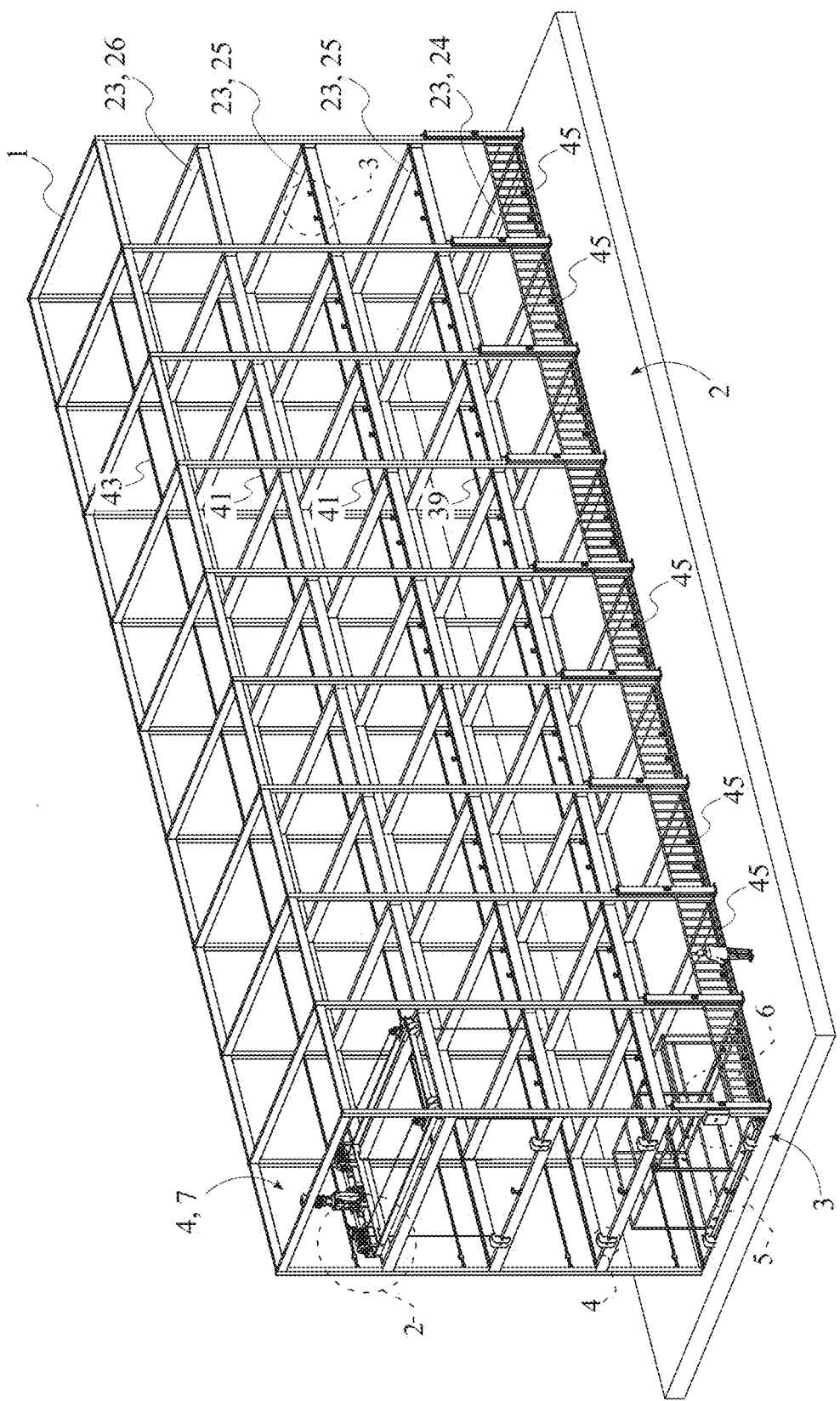
FIG. 1 is a top-front perspective view of the system of the present invention.
Figure 2:
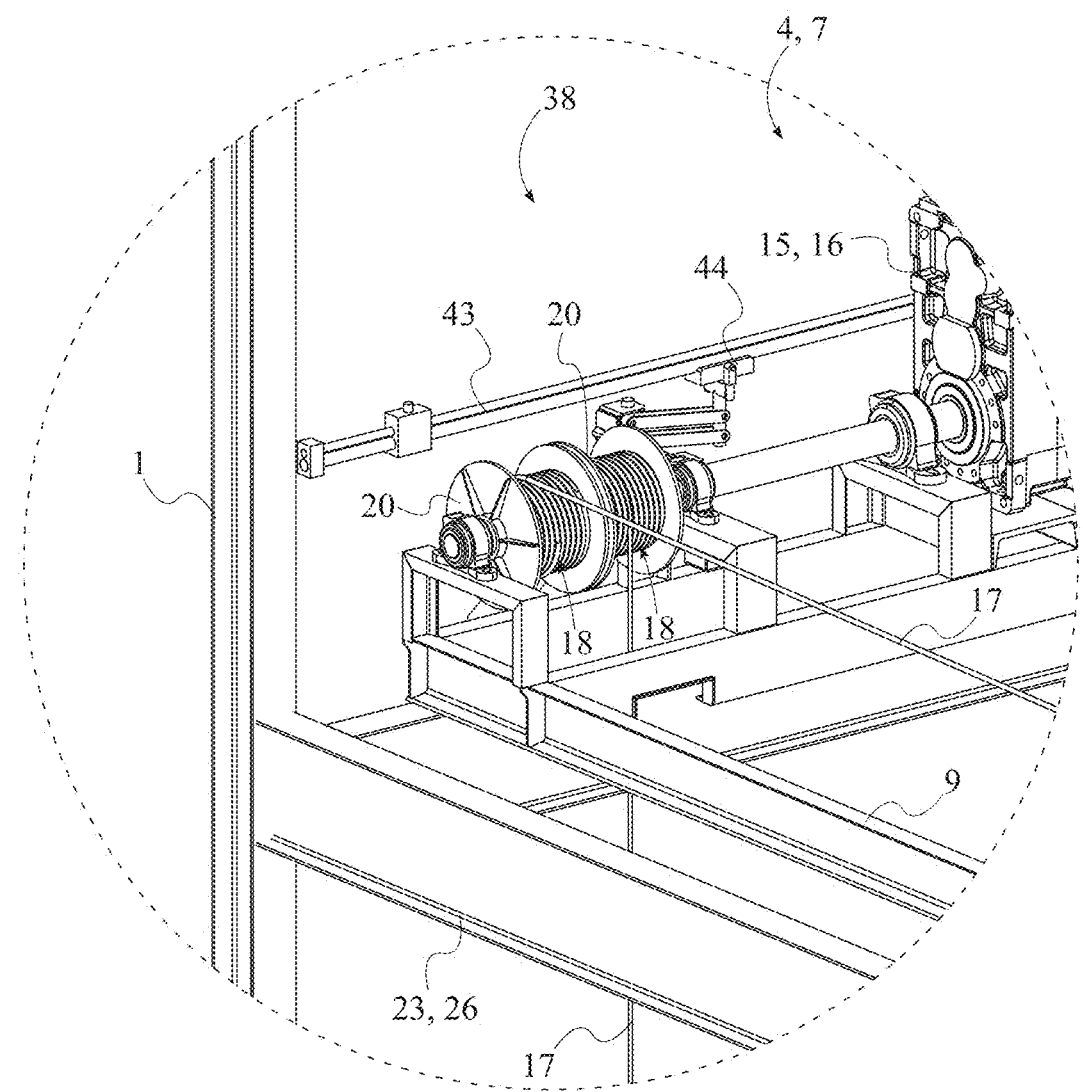
FIG. 2 is a magnified view of the winch mechanism of a middle liftable module of the present invention shown in FIG. 1.
Figure 3:
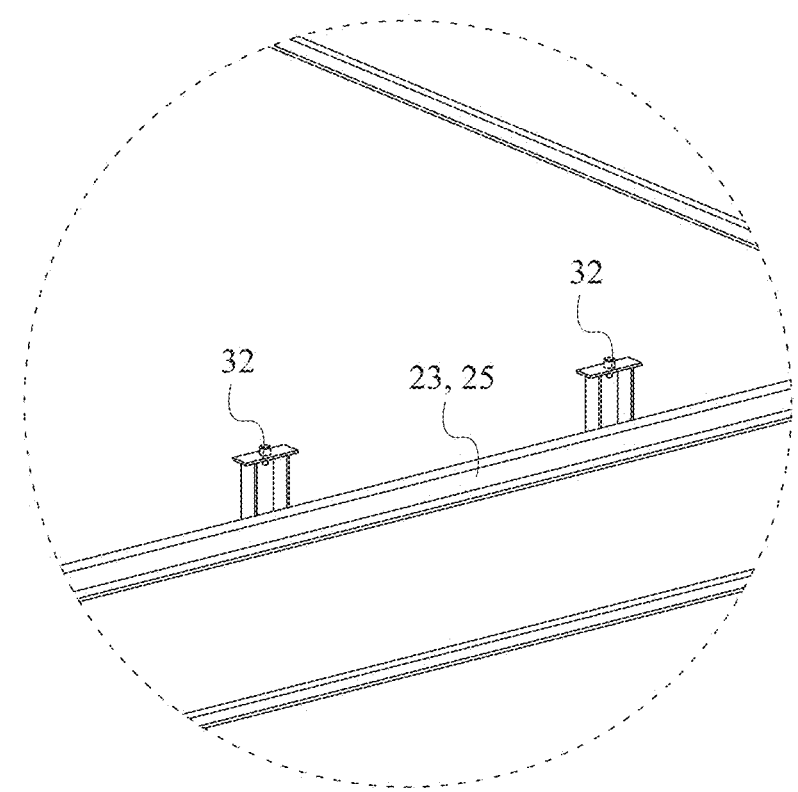
FIG. 3 is a magnified view of the sensors sets of a middle track of the present invention shown in FIG. 1.
Figure 4:
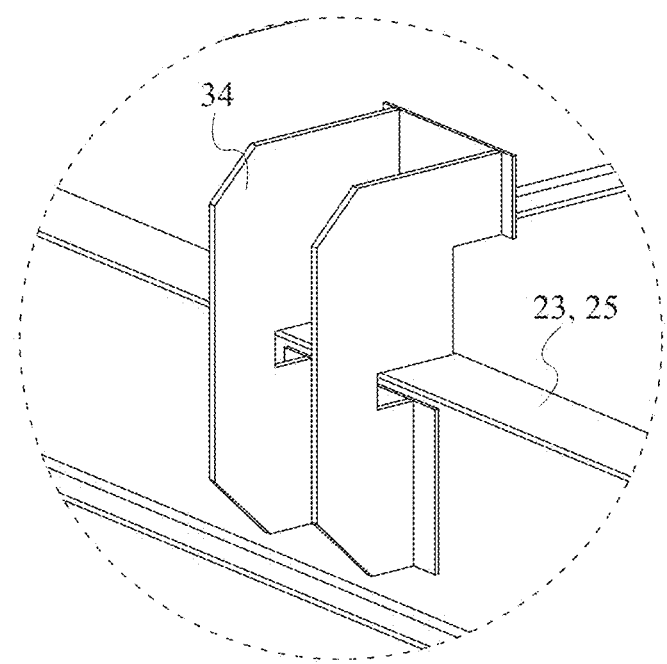
FIG. 4 is a magnified view of a track stopper of a middle track of the present invention shown in FIG. 1.
Figure 5:
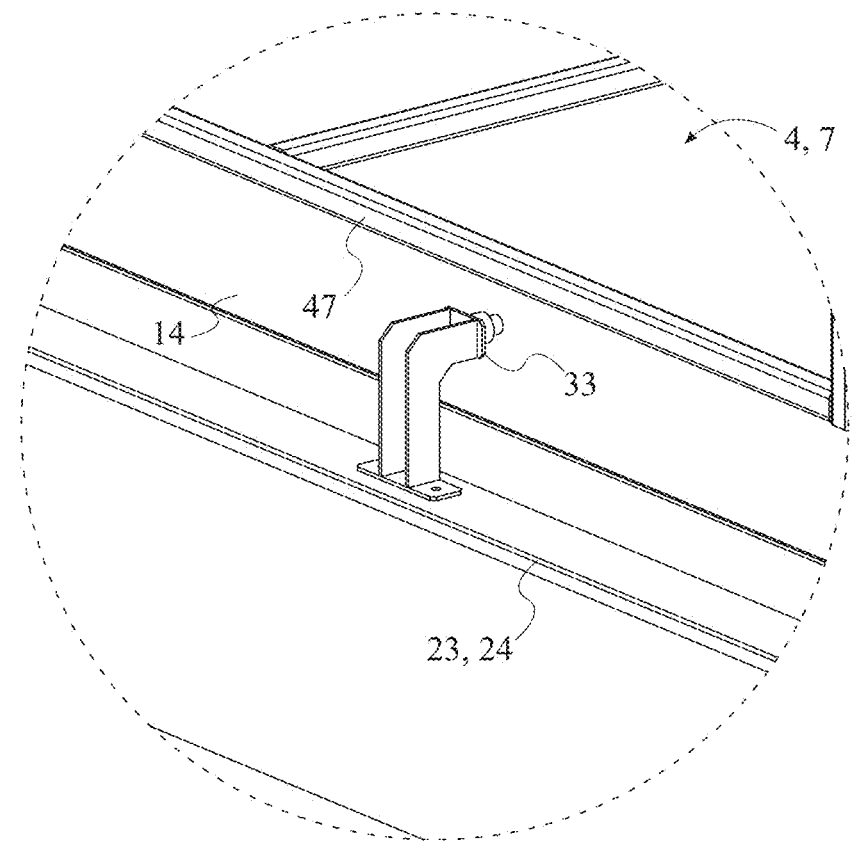
FIG. 5 is a magnified view of a terminal sensor of the ground track of the present invention shown in FIG. 1.
Figure 6:
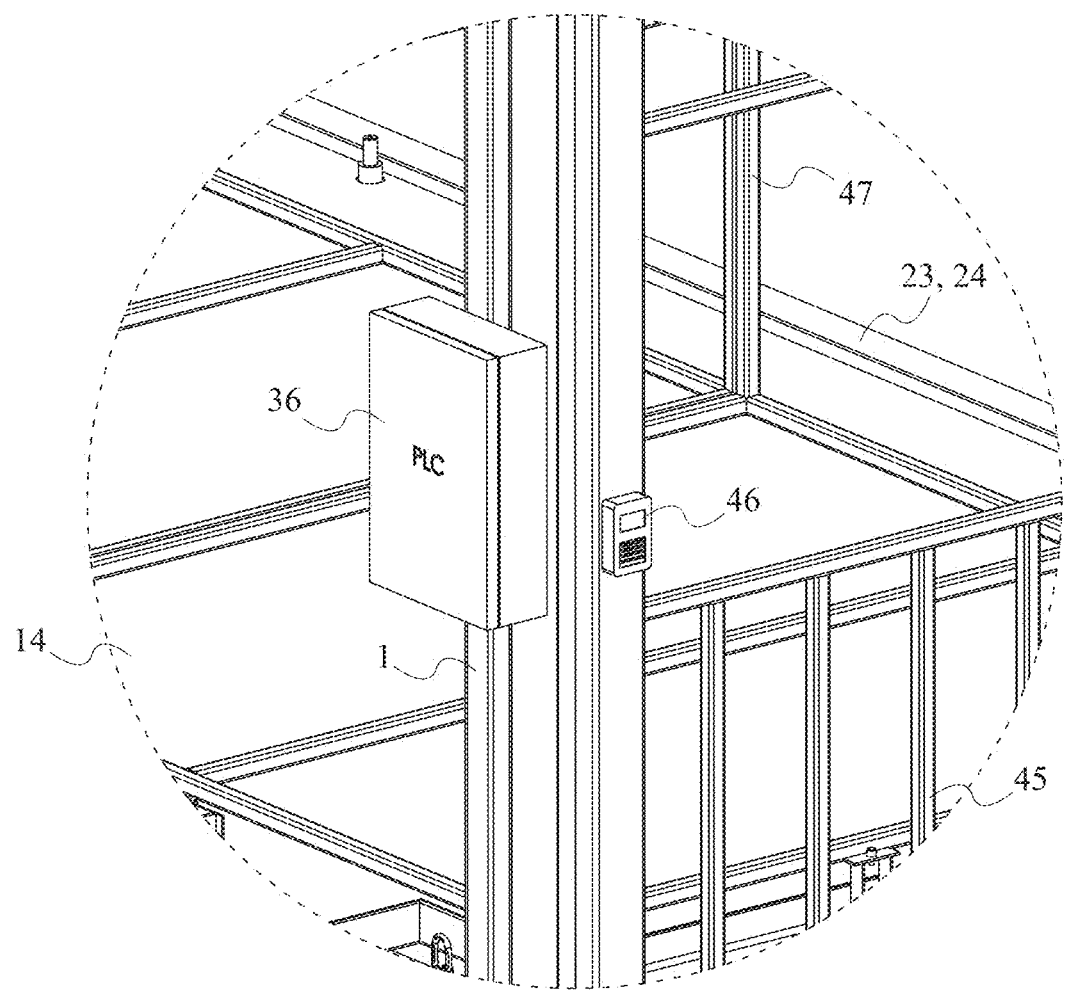
FIG. 6 is a magnified view of the system controller and a user interface of the present invention shown in FIG. 1.
Figure 7:
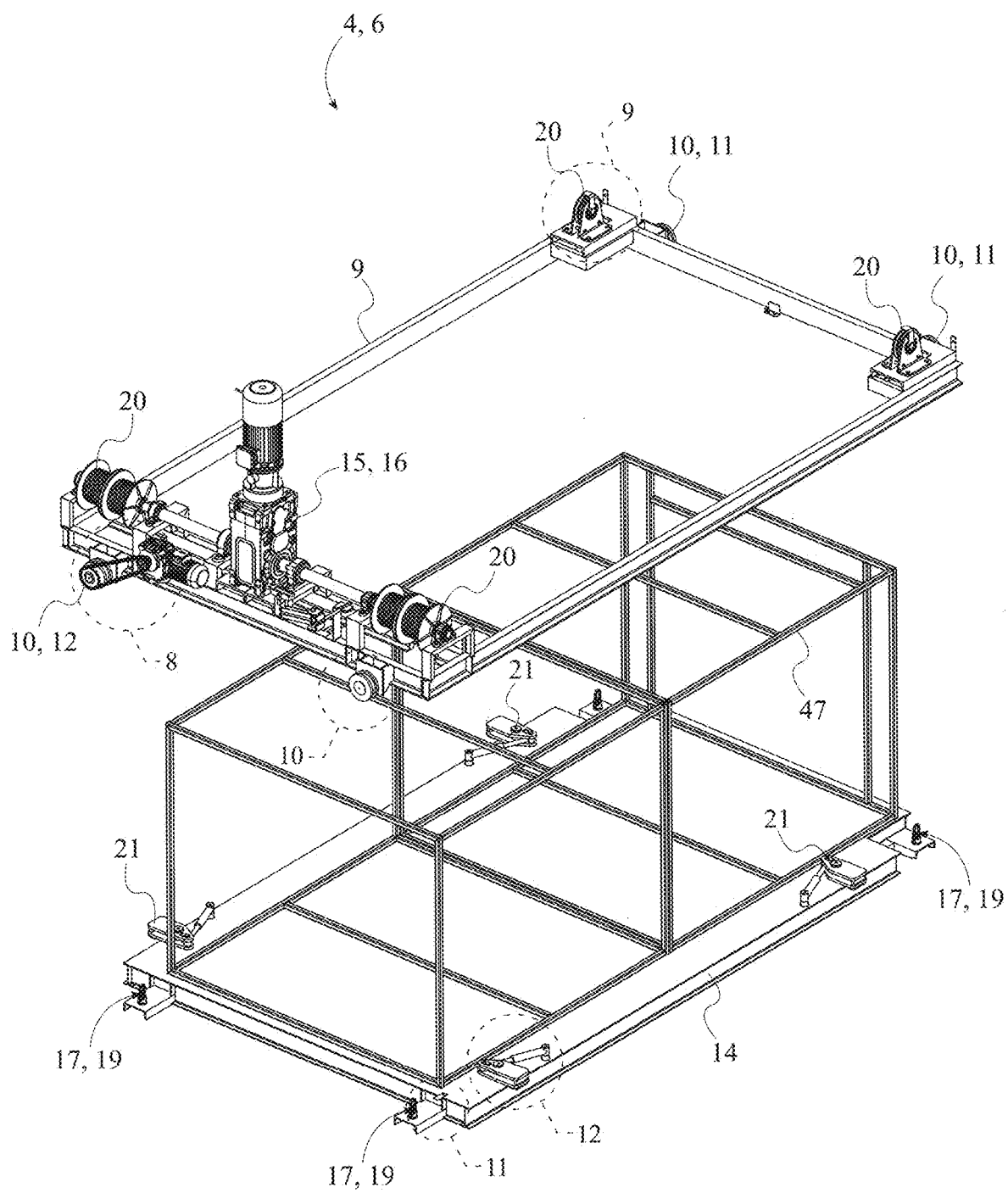
FIG. 7 is a top-front perspective view of a middle liftable module of the present invention, wherein the raisable platform is shown detached from the corresponding movable platform frame.
Figure 8:
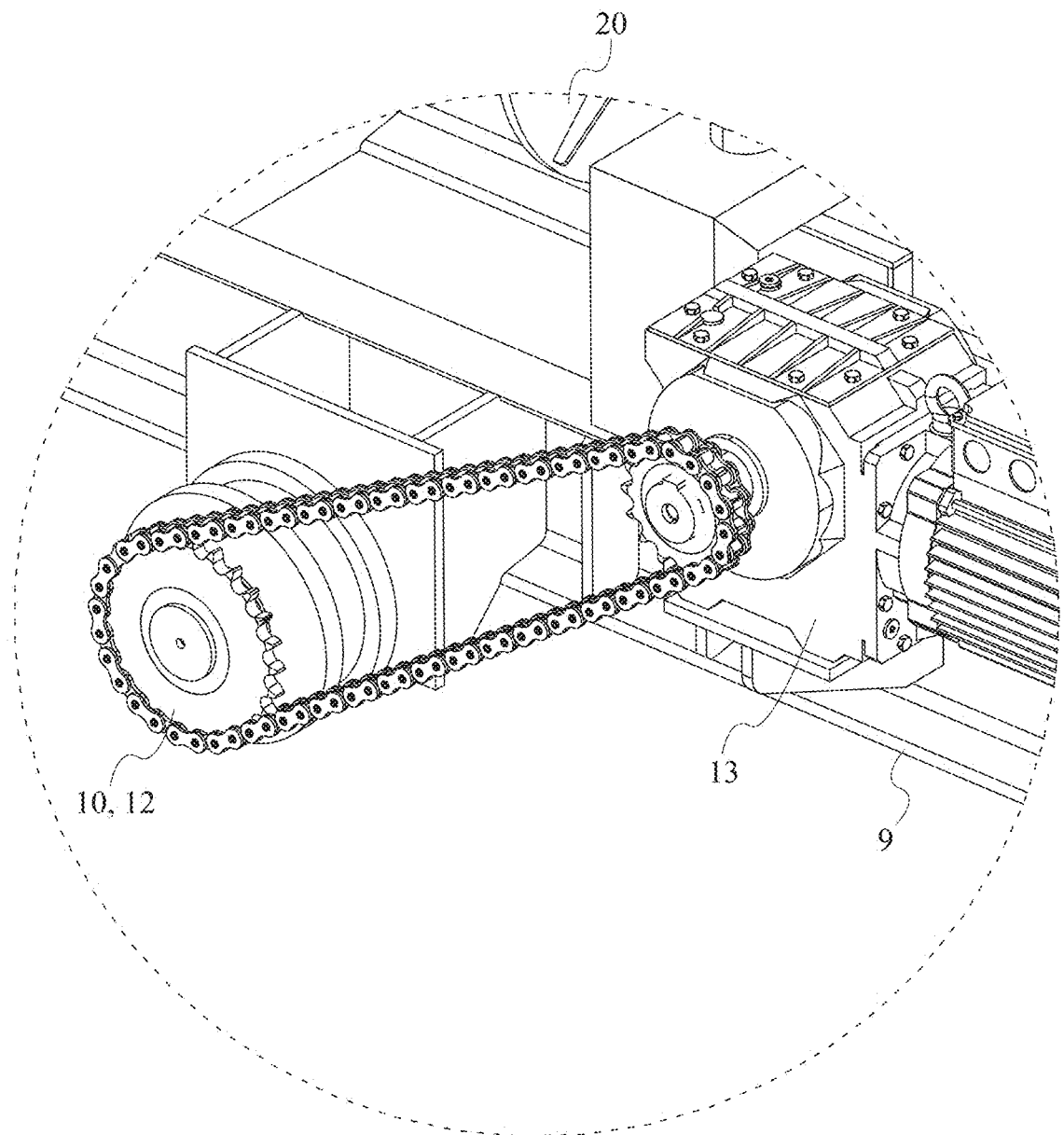
FIG. 8 is a magnified view of the roller motor and the drive roller of the roller mechanism of the present invention shown in FIG. 7.
Figure 9:
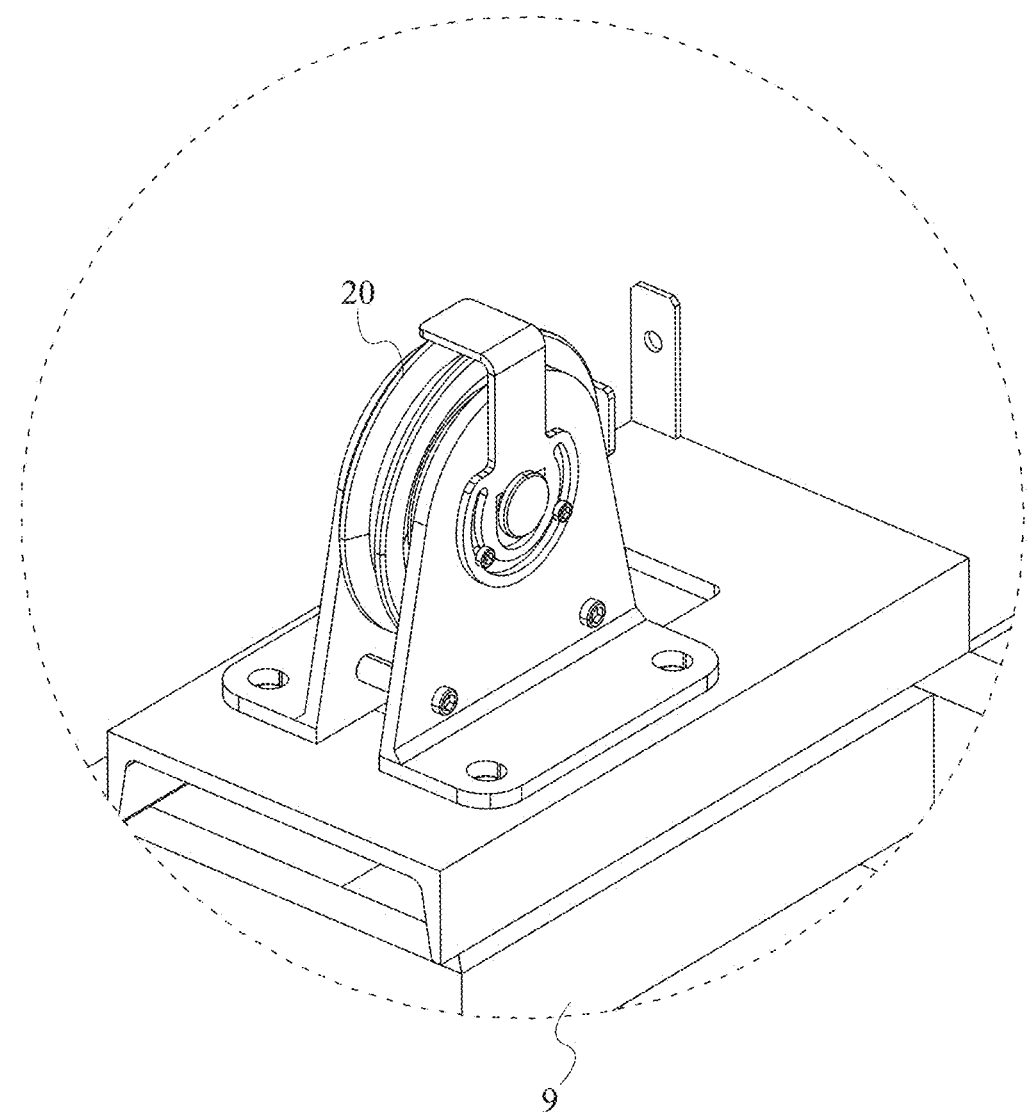
FIG. 9 is a magnified view of a spool of the winch mechanism of the present invention shown in FIG. 7.
Figure 10:
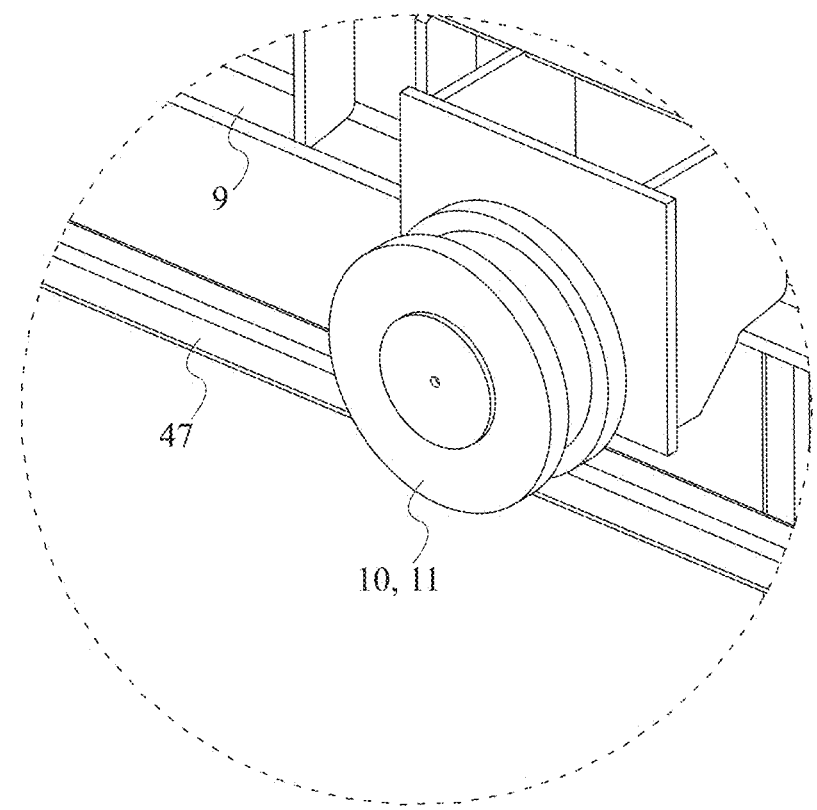
FIG. 10 is a magnified view of a roller of the roller mechanism of the present invention shown in FIG. 7.
Figure 11:
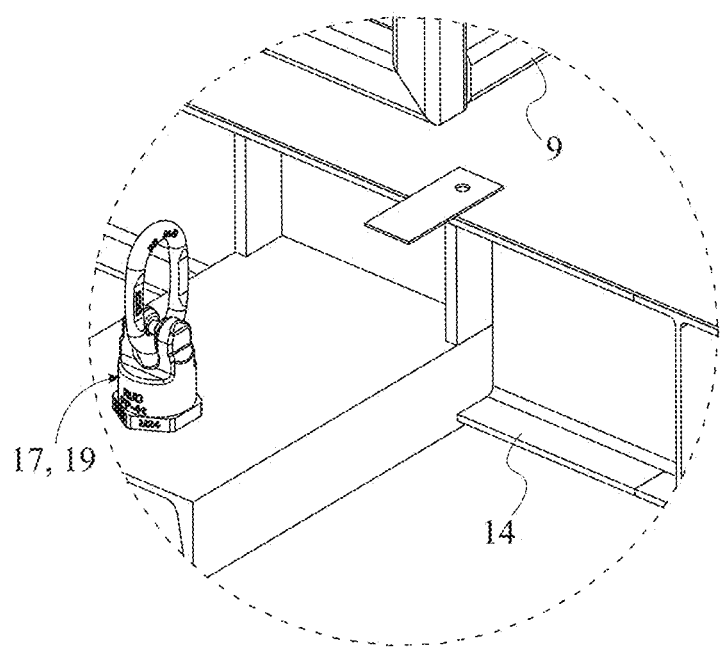
FIG. 11 is a magnified view of the raisable platform of a middle liftable module of the present invention shown in FIG. 7.
Figure 12:
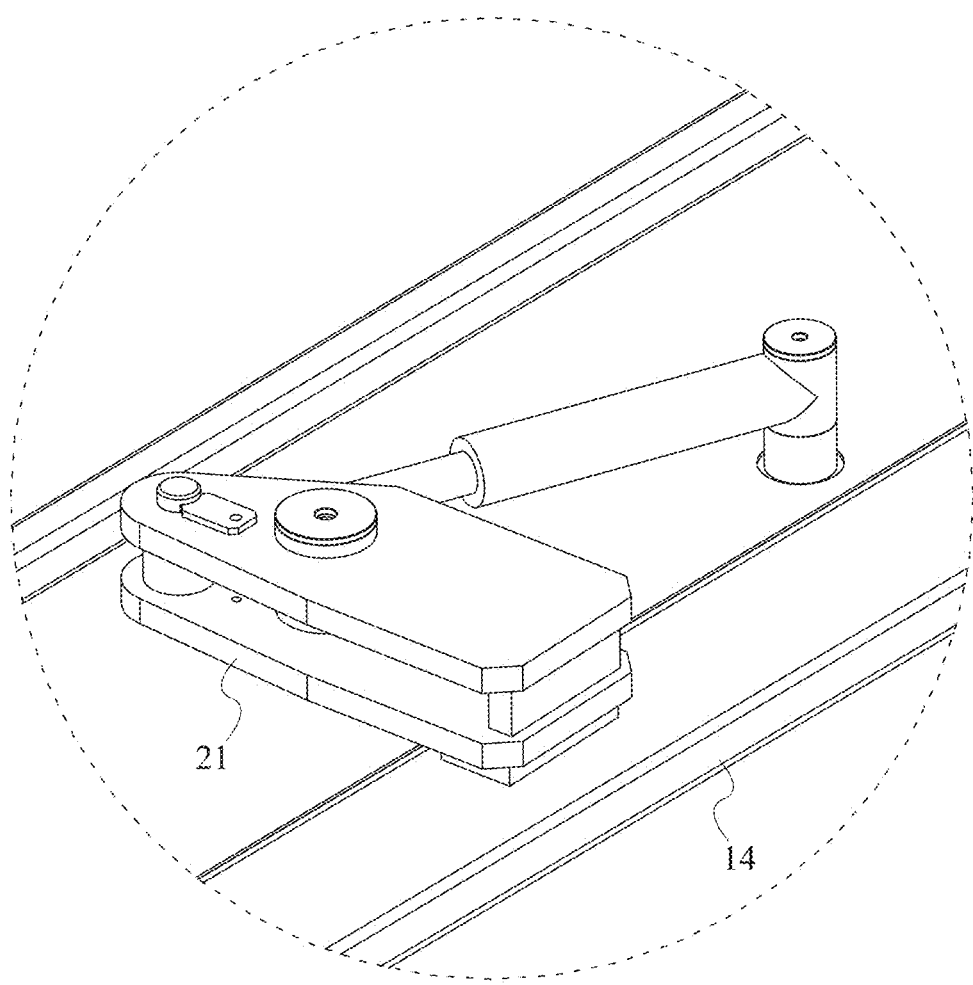
FIG. 12 is a magnified view of a motorized safety latch of the present invention shown in FIG. 7.
Figure 13:
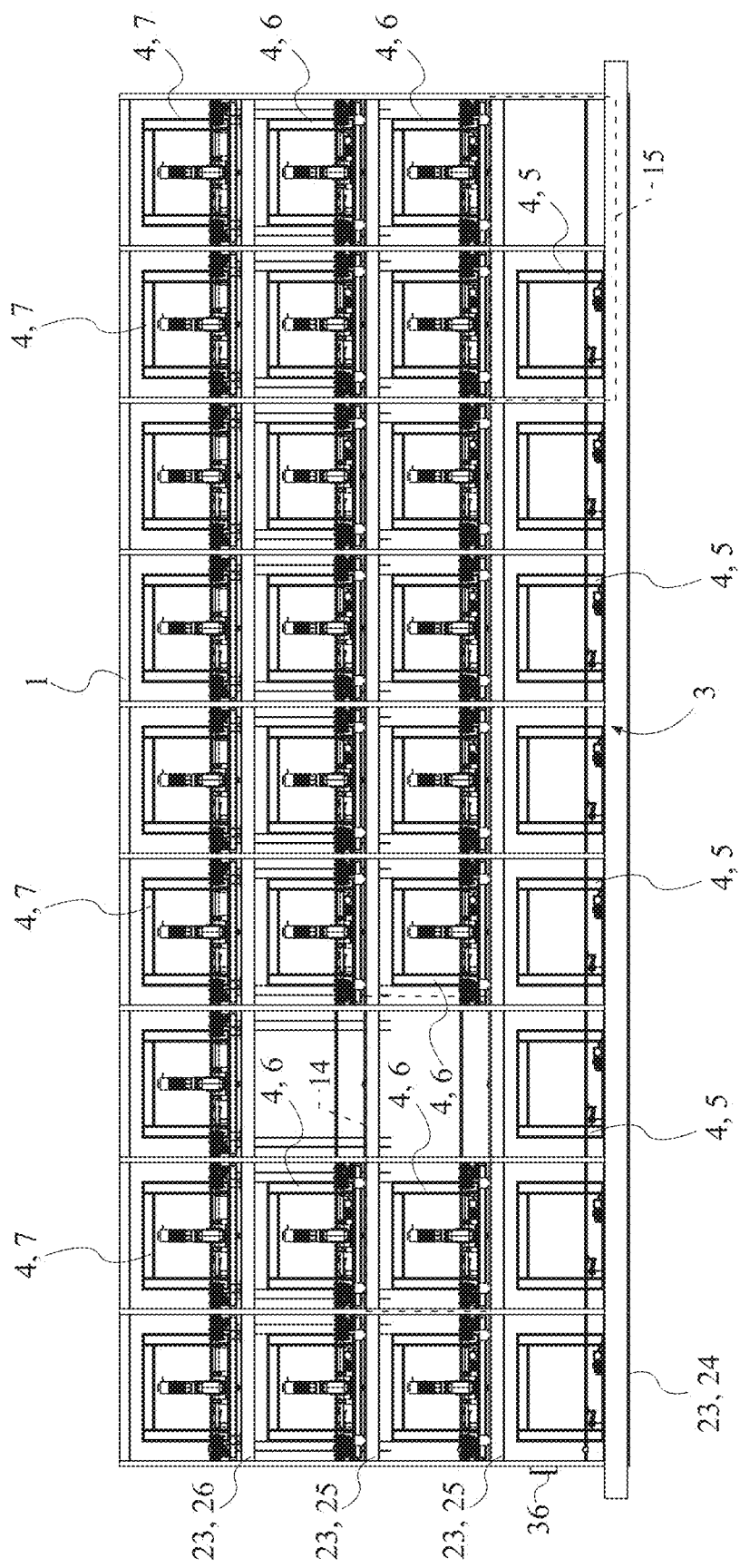
FIG. 13 is a front view of the system of the present invention.
Figure 14:
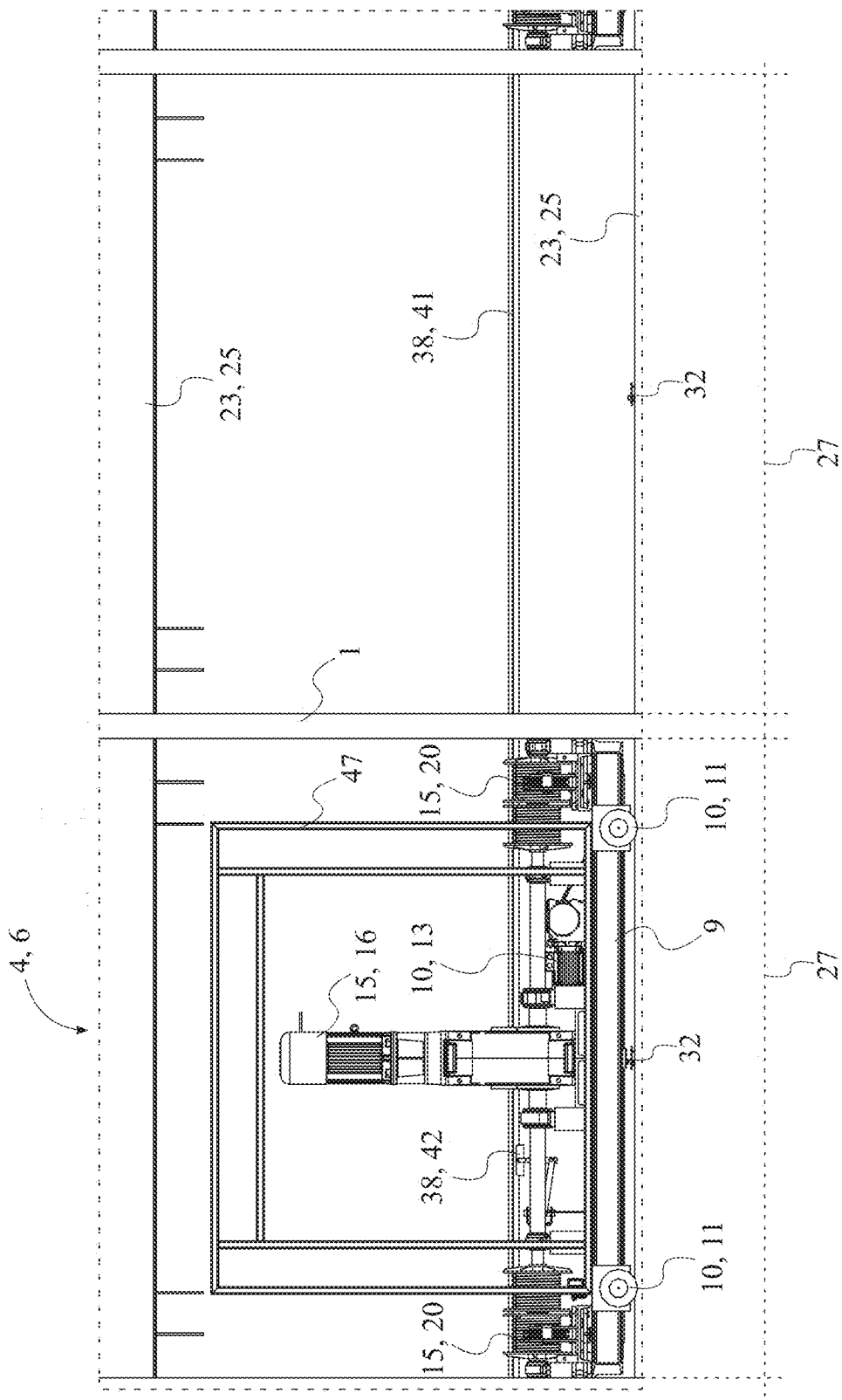
FIG. 14 is a magnified view of two adjacent track sections of a middle track of the present invention shown in FIG. 13, wherein a track section is shown with a middle liftable module, and wherein the other track section is shown empty.
Figure 15:
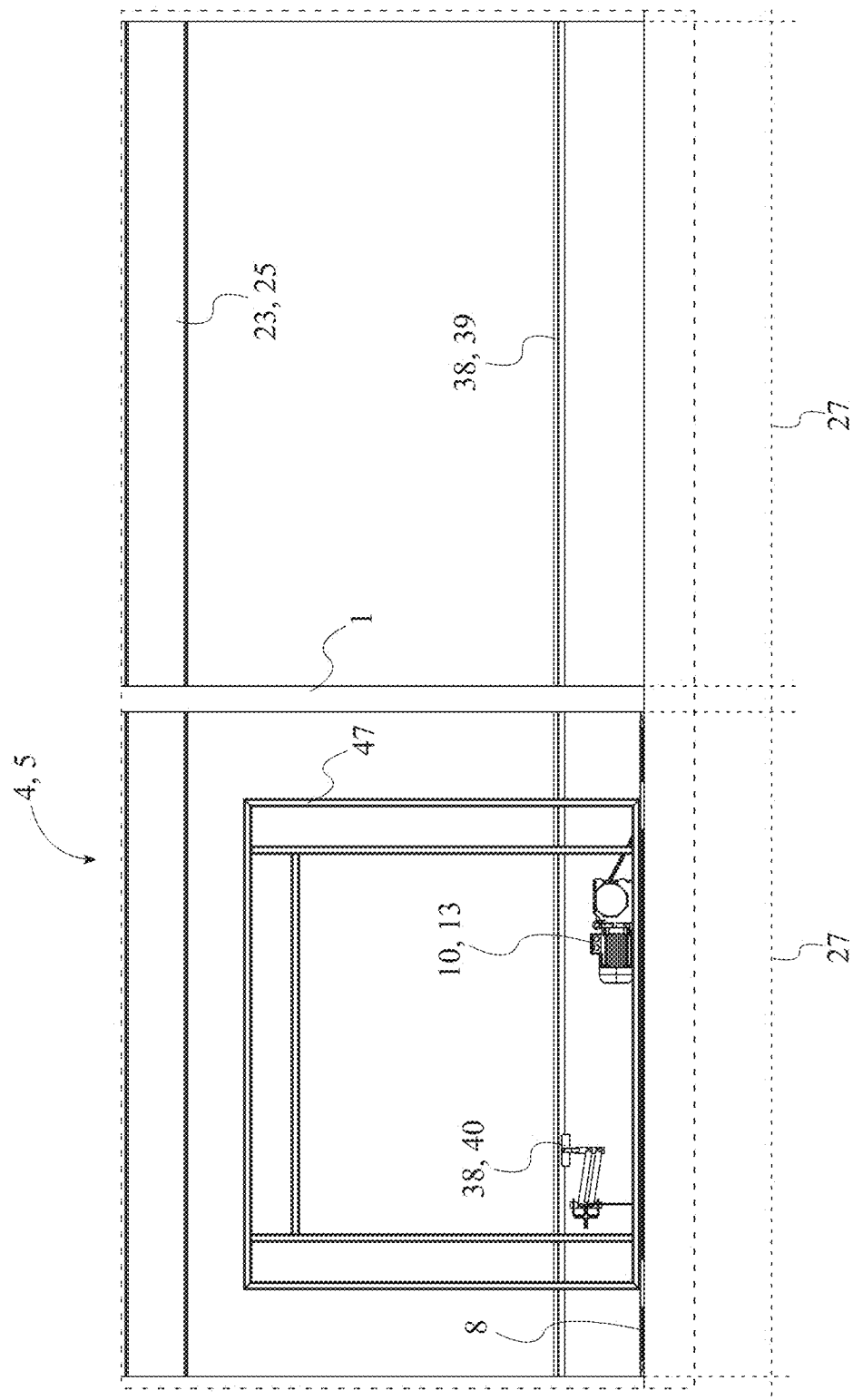
FIG. 15 is a magnified view of two adjacent track sections of the ground track of the present invention shown in FIG. 13, wherein a track section is shown with a ground module, and wherein the other track section is shown empty.
Figure 16:
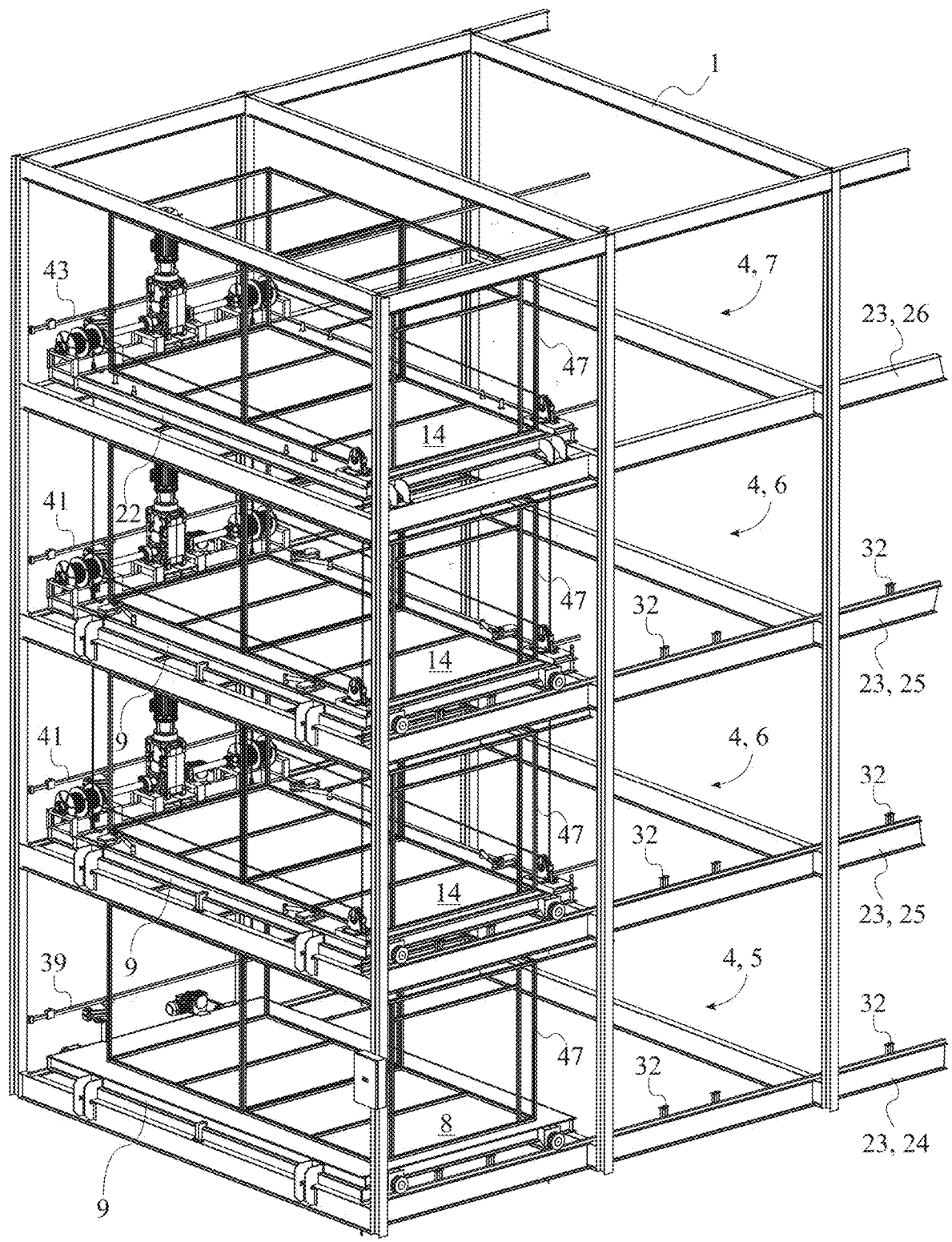
FIG. 16 is a partial top-front perspective view of the system of the present invention, wherein each support track is shown with a corresponding storage module positioned at one end of the corresponding support track.
Figure 17:
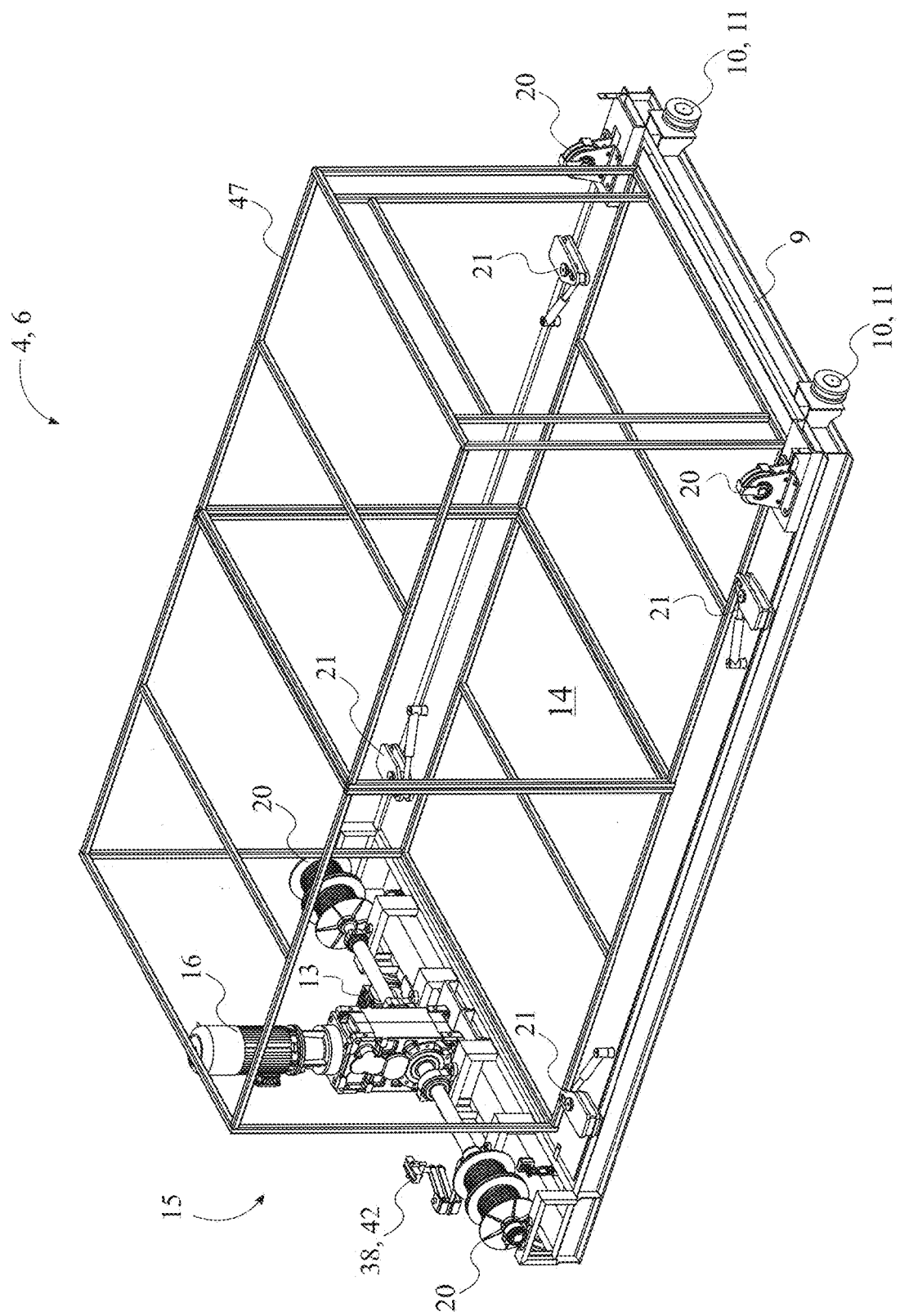
FIG. 17 is a top-front perspective view of a middle liftable module of the present invention, wherein the raisable platform is shown attached to the corresponding movable platform frame, and wherein the corresponding motorized safety latches are shown engaged.
Figure 18:
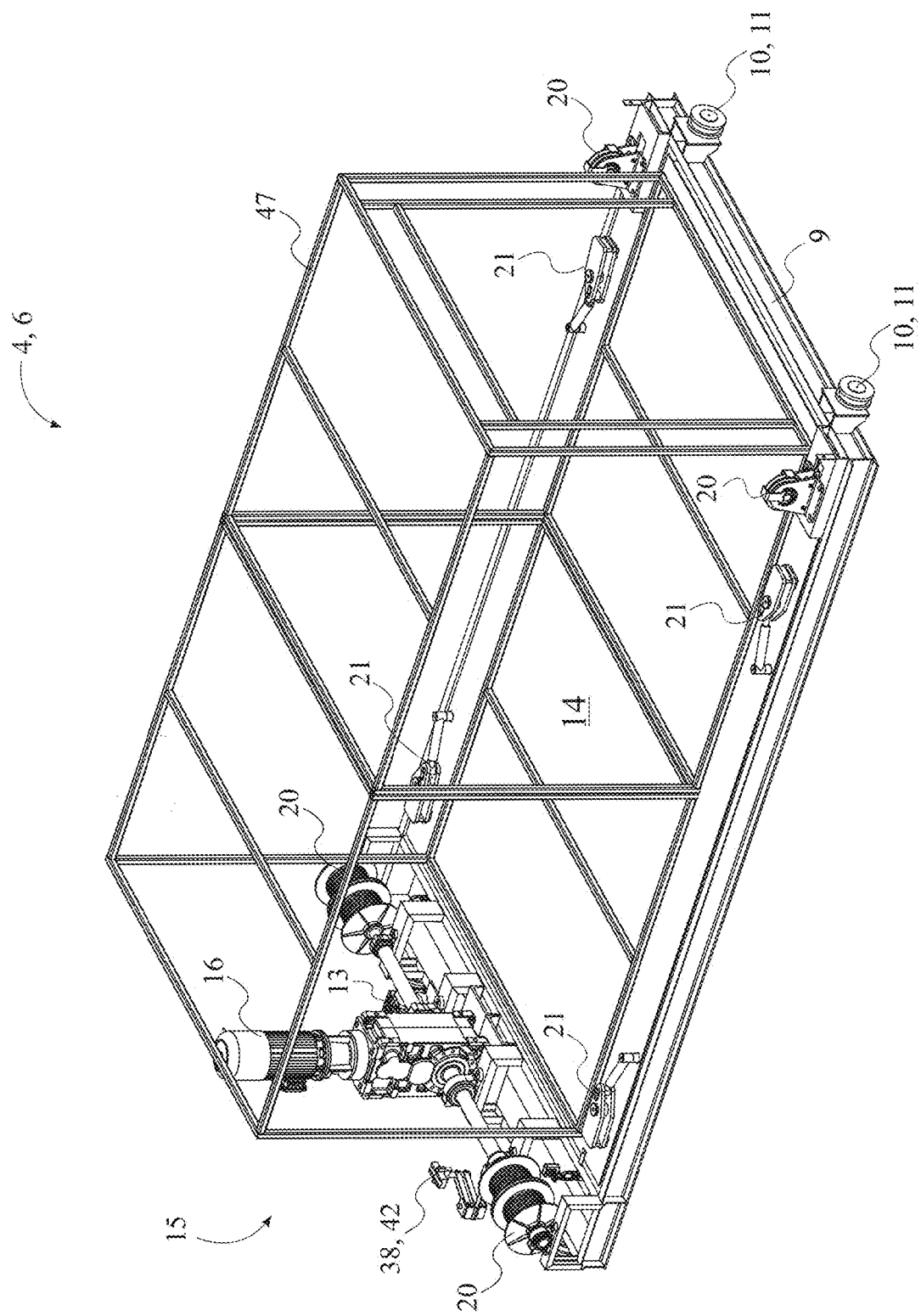
FIG. 18 is a top-front perspective view of a middle liftable module of the present invention, wherein the raisable platform is shown attached to the corresponding movable platform frame, and wherein the corresponding motorized safety latches are shown disengaged.

All illustrations of the drawings are for the purpose of describing selected versions of the present invention and are not intended to limit the scope of the present invention.

The present invention discloses an automated self-storage system that provides greater rentable square footage in a cost-effective, efficient, and environmentally friendly manner that is also convenient for customers. In general, the present invention comprises a support frame 1, a plurality of storage modules 4, a plurality of support tracks 23, a system controller 36, and a system power source 37, as can be seen in FIG. 1 through 22. The support frame 1 corresponds to the large metal structure that supports the automated operation of the present invention's system. Each of the plurality of storage modules 4 is designed to retain the stored items in an accessible manner. In addition, each of the plurality of storage modules 4 can move the retained stored items laterally, vertically, or both as necessary for the storage and retrieval of the stored items within. Each of the plurality of support tracks 23 provides structural support to the corresponding storage modules so that the plurality of storage modules 4 can be stored vertically along the support frame 1. Further, the system controller 36 enables the automated operation of each of the plurality of storage modules 4, while the system power source 37 provides the electrical power necessary for the efficient automated operation of the plurality of storage modules 4.

The general configuration of the aforementioned components allows the implementation of an automated storage facility that overcomes the limitations and downsides of traditional self-storage facilities. As can be seen in FIG. 1 through 22, the support frame 1 is preferably designed to match the available space on the target facility or land. For example, the support frame 1 can have an overall rectangular shape formed using the appropriate vertical beams, horizontal beams, and crossbeams. Each of the beams are preferably metal beams connected using the appropriate fasteners and welding when assembling the support frame 1. Further, the support frame 1 can be secured to the target facility's structure using the appropriate fastening mechanisms. For example, the support frame 1 can be installed on a level surface using concrete anchors, footing/steel plates, etc. Furthermore, additional structural support features can be implemented into the support frame 1 according to the system's requirements.

As previously discussed, the support frame 1 is preferably divided into several storage rows that retain a predetermined number of storage modules from the plurality of storage modules 4, as can be seen in FIG. 1 through 22. In the preferred embodiment, the several storage rows of the support frame 1 are preferably delimited by the plurality of support tracks 23 so that each of the plurality of storage modules 4 is designated to a storage row corresponding to the support track the storage module is installed on. Generally, the plurality of support tracks 23 comprises a ground track 24, a plurality of middle tracks 25, and a top track 26. The ground track 24 preferably corresponds to the support track adjacent to the ground, the plurality of middle tracks 25 corresponds to the intermediate support tracks, and the top track 26 corresponds to the highest support track on the support frame 1. Likewise, the plurality of storage modules 4 comprises a plurality of ground modules 5, a plurality of middle liftable modules 6, and a plurality of top liftable modules 7. The plurality of ground modules 5 corresponds to the storage modules installed on the ground track 24, the plurality of middle liftable modules 6 corresponds to the storage modules installed on the various middle tracks from the plurality of middle tracks 25, and the plurality of top liftable modules 7 corresponds to the storage modules installed on the top track 26.

In general, the present invention's system can be implemented as follows: the plurality of support tracks 23 is vertically distributed along the support frame 1 due to the vertical design of the support frame 1, as can be seen in FIG. 1 through 22. The plurality of support tracks 23 is positioned parallel to each other to maintain the supported storage modules upright within the support frame 1. In addition, the plurality of support tracks 23 is mounted within the support frame 1 to secure each of the plurality of support tracks 23 to the support frame 1. Further, the ground track 24 is positioned opposite the top track 26 across the plurality of middle tracks 25. As previously discussed, the ground track 24 correspond to the support track from the plurality of support tracks 23 positioned on the ground level. So, the plurality of middle tracks 25 is positioned above the ground track 24, and the top track 26 is positioned above the plurality of middle tracks 25. Further, each of the plurality of storage modules 4 is distributed along the corresponding support track from the plurality of support tracks 23.

As can be seen in FIG. 1 through 22, the plurality of storage modules 4 is distributed according to a predetermined arrangement throughout the plurality of support tracks 23. In the preferred embodiment, the plurality of ground modules 5 is movably mounted along the ground track 24 so that each ground module from the plurality of ground modules 5 has a storage space on the ground track 24. Similarly, the plurality of middle liftable modules 6 is movably mounted along the corresponding middle track from the plurality of middle tracks 25. In other words, each middle liftable module from the plurality of middle liftable modules 6 has a storage space on the corresponding middle track from the plurality of middle tracks 25. Likewise, the plurality of top liftable modules 7 is mounted onto the top track 26 so that each top liftable module from the plurality of top liftable modules 7 has a storage space on the top track 26. Further, the system controller 36 is electronically connected to each storage module from the plurality of storage modules 4 so that the system controller 36 can oversee the automatic operation of each of the plurality of storage modules 4. Furthermore, the system power source 37 is electrically connected to each storage module from the plurality of storage modules 4 to distribute the electrical power necessary for the operation of each of the plurality of storage modules 4.

In the preferred embodiment, the plurality of ground modules 5 includes several movable storage modules that can move along the ground track 24, as can be seen in FIG. 1 through 22. Since the plurality of ground modules 5 is positioned at the ground level, the plurality of ground modules 5 does not require vertical movement to enable access to the stored items. However, each of the plurality of ground modules 5 needs to be able to move to provide space for the upper storage modules when the upper storage modules are lowered to the ground level. To do so, each of the plurality of ground modules 5 may comprise a fixed platform 8, a movable platform frame 9, and a roller mechanism 10. The fixed platform 8 corresponds to the structure that retains the items to be stored within the corresponding ground module from the plurality of ground modules 5. The movable platform frame 9 enables the mounting of the corresponding fixed platform 8 to the ground track 24 in such a way that each fixed platform 8 is moved along the ground track 24 by the corresponding movable platform frame 9. The roller mechanism 10 enables the corresponding movable platform frame 9 to move along the ground track 24 as needed for the automated operation of the present invention' system.

In general, each of the plurality of ground modules 5 can be implemented as follows: each fixed platform 8 is aligned with the corresponding movable platform frame 9 of the plurality of ground modules 5, as can be seen in FIG. 1 through 22. Each movable platform frame 9 of the plurality of ground modules 5 is preferably a square frame with a size large enough to fit on the ground track 24, and each fixed platform 8 is a square platform with a size that matches the size of the corresponding square frame. In addition, each fixed platform 8 is mounted onto the corresponding movable platform frame 9 of the plurality of ground modules 5 to permanently secure each fixed platform 8 of the plurality of ground modules 5 to the corresponding movable platform frame 9. Further, each movable platform frame 9 of the plurality of ground modules 5 is rollably mounted onto the ground track 24 by the corresponding roller mechanism 10 so that each movable platform frame 9 can move along the ground track 24.

Different types of mechanisms can be implemented for each roller mechanism 10 of the plurality of ground modules 5 that works with the ground track 24. In the preferred embodiment, the ground track 24 is preferably constructed using two metal rails that are positioned parallel and opposite each other across the support frame 1, as can be seen in FIG. 1 through 22. To match this version of the ground track 24, the roller mechanism 10 of each of the plurality of ground modules 5 comprises a plurality of rollers 11 and at least one roller motor 13. The plurality of rollers 11 enables the corresponding movable platform frame 9 of the plurality of ground modules 5 to easily move along the ground track 24. The at least one roller motor 13 provides the torque necessary to move the corresponding movable platform frame 9 of the plurality of ground modules 5. The at least one roller motor 13 is preferably an electric motor powerful enough to move the corresponding movable platform frame 9. Further, the at least one roller motor 13 is designed to never start at full power which could cause any slip on the movement. For that reason, an inverter is utilized to start the at least one roller motor 13 at low speed and then accelerate. Friction coefficient for steel rollers on steel rails is very low so a small motor to move the load is needed. In addition, the plurality of rollers 11 may comprise at least one drive roller 12 which is driven by the torque generated by the at least one roller motor 13.

As can be seen in FIG. 1 through 22, to implement this embodiment of the roller mechanism 10 of the plurality of ground modules 5, the plurality of rollers 11 is perimetrically distributed about the corresponding movable platform frame 9 of the plurality of ground modules 5. The plurality of rollers 11 is preferably positioned on the lateral edges adjacent to the metal rails of the ground track 24. Further, each of the plurality of rollers 11 is rotatably mounted onto the corresponding movable platform frame 9 of the plurality of ground modules 5. This way, the plurality of rollers 11 is secured to the corresponding movable platform frame 9 in such a way that each roller can rotate. Further, each movable platform frame 9 of the plurality of ground modules 5 is rollably mounted onto the ground track 24 by the corresponding rollers from the plurality of rollers 11. In addition, the at least one roller motor 13 is mounted onto the corresponding movable platform frame 9 of the plurality of ground modules 5 to secure the at least one roller motor 13 to the corresponding movable platform frame 9. The at least one roller motor 13 is also torsionally connected to the at least one drive roller 12 of the corresponding roller mechanism 10 to transmit the torque generated by the at least one roller motor 13 to the at least one drive roller 12. For example, a belt mechanism can be implemented that transmits the rotation from the axle of the at least one roller motor 13 to the axle of the at least one drive roller 12. Further, the system controller 36 is electronically connected to the at least one roller motor 13 of each roller mechanism 10 to oversee the automated operation of the at least one roller motor 13. Furthermore, the system power source 37 is electrically connected to the at least one roller motor 13 of each roller mechanism 10 to provide the electrical power necessary for the operation of the at least one roller motor 13.

Due to the linear movement capabilities of the plurality of ground modules 5, the present invention may further comprise a power distribution subsystem 38 that is able to power the moving storage modules of the plurality of ground modules 5, as can be seen in FIG. 1 through 22. In the preferred embodiment, the power distribution subsystem 38 implements a mechanism similar to the power system of trolleys. So, the power distribution subsystem 38 may comprise a ground conductor bar 39 and a plurality of ground current collectors 40. The ground conductor bar 39 is an elongated electricity conductor that spans the length of the ground track 24 to distribute electrical power to each of the plurality of ground modules 5. The plurality of ground current collectors 40 corresponds to electrical connectors coupled to the ground conductor bar 39 in such a way that each of the plurality of ground current collectors 40 can move along with the corresponding ground module from the plurality of ground modules 5.

In general, the ground conductor bar 39 and the plurality of ground current collectors 40 can be implemented as follows: the ground conductor bar 39 is positioned parallel and offset to the ground track 24 to not obstruct the operation of the plurality of ground modules 5, as can be seen in FIG. 1 through 22. The ground conductor bar 39 is also mounted within the support frame 1 to secure the ground conductor bar 39 to the support frame 1. On the other hand, each of the plurality of ground current collectors 40 is mounted onto the corresponding movable platform frame 9 of the plurality of ground modules 5. In other words, each ground module has a corresponding ground current collector. In addition, each of the plurality of ground current collectors 40 is slidably mounted along the ground conductor bar 39 so that each ground current collector moves along with the corresponding ground module. Further, the system power source 37 is electrically connected to ground conductor bar 39, and each of the plurality of ground current collectors 40 is operatively coupled to the corresponding roller mechanism 10 of the plurality of ground modules 5. Each of the plurality of ground current collectors 40 enables the transmission of electrical power from the ground conductor bar 39 to the corresponding roller mechanism 10 using different electrical systems.

For example, in the preferred embodiment, the ground conductor bar 39 can be an eight-bar conductor that includes a pair of round bars, one on top of the other, as can be seen in FIG. 1 through 22. The bottom bar is made of copper to conduct electricity to the whole length of operation. Each of the plurality of ground current collectors 40 is a bracket-like device that is in contact with the bottom bar of the ground conductor bar 39. The portion engaging the ground conductor bar 39 is a sliding shoe connector that allows each of the plurality of ground current collectors 40 to slide along the ground conductor bar 39 when the corresponding ground module is moving. Each of the plurality of ground current collectors 40 collects the electrical current from the ground conductor bar 39 and forwards the current to the at least one roller motor 13. The appropriate wiring and other electrical components can be utilized to electrically connect each of the plurality of ground current collectors 40 to the at least one roller motor 13 of the corresponding roller mechanism 10. In other embodiments, different electrical mechanisms can be implemented to provide the necessary electrical power to each of the plurality of ground modules 5.

In the preferred embodiment, the plurality of middle liftable modules 6 includes several movable storage modules that can move along the corresponding middle track from the plurality of middle tracks 25, as can be seen in FIG. 1 through 22. Each of the plurality of middle liftable modules 6 can move to clear the way for upper storage modules as necessary. However, since the plurality of middle liftable modules 6 is raised off the ground by the support frame 1, the storage modules of the plurality of middle liftable modules 6 need to be able to raise and lower the stored items within as necessary. To do so, each of the plurality of middle liftable modules 6 may comprise a raisable platform 14, a movable platform frame 9, a roller mechanism 10, and a winch mechanism 15. The raisable platform 14 corresponds to the flat structure that retains the items to be stored within the corresponding middle liftable module from the plurality of middle liftable modules 6. The movable platform frame 9 enables the mounting of the corresponding raisable platform 14 to the corresponding middle track from the plurality of middle tracks 25 in such a way that each raisable platform 14 is moved along the corresponding middle track by the corresponding movable platform frame 9. The roller mechanism 10 enables the corresponding movable platform frame 9 to move along the corresponding middle track. The winch mechanism 15 enables the corresponding raisable platform 14 to be raised and lowered along the support frame 1. This allows ground access to the plurality of middle liftable modules 6 without moving the entire storage module.

In general, each of the plurality of middle liftable modules 6 can be implemented as follows: each raisable platform 14 is aligned with the corresponding movable platform frame 9 of the plurality of middle liftable modules 6, as can be seen in FIG. 1 through 22. Each movable platform frame 9 of the plurality of middle liftable modules 6 is preferably a square frame with a size large enough to fit on the corresponding middle track, and each raisable platform 14 is a square platform with a size that matches the size of the corresponding square frame. In addition, each raisable platform 14 is tethered to the corresponding movable platform frame 9 of the plurality of middle liftable modules 6 by the corresponding winch mechanism 15. This way, each raisable platform 14 can raised or lowered as necessary using the corresponding winch mechanism 15. Further, each movable platform frame 9 of the plurality of middle liftable modules 6 is rollably mounted onto the middle track from the plurality of middles tracks by the corresponding roller mechanism 10. This allows each movable platform frame 9 of the plurality of middle liftable modules 6 to move along the corresponding middle track from the plurality of middle tracks 25.

In the preferred embodiment, the roller mechanism 10 of the plurality of middle liftable modules 6 is similar to the roller mechanism 10 of the plurality of ground modules 5, as can be seen in FIG. 1 through 22. In addition, each middle track from the plurality of middle tracks 25 is similar to the ground track 24. So, the roller mechanism 10 of each of the plurality of middle liftable modules 6 comprises a plurality of rollers 11 and at least one roller motor 13. Likewise, the plurality of rollers 11 may also comprise at least one drive roller 12 which is driven by the torque generated by the at least one roller motor 13.

As can be seen in FIG. 1 through 22, to implement this embodiment of the roller mechanism 10 of the plurality of middle liftable modules 6, the plurality of rollers 11 is perimetrically distributed about the corresponding movable platform frame 9 of the plurality of middle liftable modules 6. The plurality of rollers 11 is preferably positioned on the lateral edges adjacent to the metal rails of the corresponding middle track. Further, each of the plurality of rollers 11 is rotatably mounted onto the corresponding movable platform frame 9 of the plurality of middle liftable modules 6. This way, the plurality of rollers 11 is secured to the corresponding movable platform frame 9 in such a way that each roller can rotate. Further, each movable platform frame 9 of the plurality of middle liftable modules 6 is rollably mounted onto the corresponding middle track from the plurality of middle tracks 25 by the corresponding rollers from the plurality of rollers 11. In addition, the at least one roller motor 13 is mounted onto the corresponding movable platform frame 9 of the plurality of middle liftable modules 6 to secure the at least one roller motor 13 to the corresponding movable platform frame 9. The at least one roller motor 13 is also torsionally connected to the at least one drive roller 12 of the corresponding roller mechanism 10 to transmit the torque generated by the at least one roller motor 13 to the at least one drive roller 12. For example, a belt mechanism can be implemented that transmits the rotation from the axle of the at least one roller motor 13 to the axle of the at least one drive roller 12. Further, the system controller 36 is electronically connected to the at least one roller motor 13 of each roller mechanism 10 to oversee the automated operation of the at least one roller motor 13. Furthermore, the system power source 37 is electrically connected to the at least one roller motor 13 of each roller mechanism 10 to provide the electrical power necessary for the operation of the at least one roller motor 13.

Similar to the roller mechanism 10, each winch mechanism 15 of the plurality of middle liftable modules 6 can include different types of mechanisms that allow the controlled lift of the corresponding raisable platform 14, as can be seen in FIG. 1 through 22. In the preferred embodiment, the winch mechanism 15 of each of the plurality of middle liftable modules 6 comprises a winch motor 16, a plurality of hoisting cables 17, and a plurality of spools 20. The winch motor 16 provides the torque necessary to rotate each of the plurality of spools 20 to wind or unwind the corresponding hoisting cables from the plurality of hoisting cables 17. The plurality of hoisting cables 17 enables the tethering of each raisable platform 14 to the corresponding movable platform frame 9 of the plurality of middle liftable modules 6 via the plurality of spools 20. Further, each of the plurality of hoisting cables 17 comprises a first cable end 18 and a second cable end 19 corresponding to the terminal ends of each hoisting cable.

In the preferred embodiment, each winch mechanism 15 can be implemented as follows: the plurality of spools 20 and the winch motor 16 are perimetrically distributed about the corresponding movable platform frame 9 of the plurality of middle liftable modules 6, as can be seen in FIG. 1 through 22. The plurality of spools 20 is distributed in such a way that the corresponding raisable platform 14 is evenly hoisted by the winch mechanism 15 to keep the corresponding raisable platform 14 parallel to the ground. In addition, each of the plurality of spools 20 and the winch motor 16 is mounted onto the corresponding movable platform frame 9 of the plurality of middle liftable modules 6 to secure the plurality of spools 20 and the winch motor 16 to the corresponding movable platform frame 9. Each of the plurality of spools 20 is also torsionally connected to the winch motor 16 so that the torque generated by the winch motor 16 is transmitted to each of the plurality of spools 20. Further, the first cable end 18 of each of the plurality of hoisting cables 17 is laterally connected to the corresponding spool from the plurality of spools 20 to secure each hoisting cable to the corresponding spool. On the other hand, the second cable end 19 of each of the plurality of hoisting cables 17 is connected onto the corresponding raisable platform 14 of the plurality of middle liftable modules 6 to secure each hoisting cable to the corresponding raisable platform 14. In addition, the system controller 36 is electronically connected to the winch motor 16 of each of the plurality of middle liftable modules 6 to oversee the automated operation of each winch motor 16. Furthermore, the system power source 37 is electrically connected to the winch motor 16 of each of the plurality of middle liftable modules 6 to provide the electrical power necessary for the operation of each winch motor 16.

As can be seen in FIG. 1 through 22, the plurality of spools 20 and the winch motor 16 of each winch mechanism 15 can be implemented on the corresponding middle liftable module from the plurality of middle liftable modules 6 in various ways. In some embodiments, the plurality of spools 20 can be divided into main spools and secondary spools. The main spools preferably correspond to the spools from the plurality of spools 20 that are directly connected to the winch motor 16. The secondary spools help distribute the corresponding hoisting cables from the plurality of hoisting cables 17 to evenly support the raisable platform 14. To do so, the main spools and the winch motor 16 can be distributed along a first lateral edge of the corresponding movable platform frame 9 of the plurality of middle liftable modules 6. The winch motor 16 is preferably centered on the first lateral edge, while the main spools are arranged on both opposite sides of the winch motor 16. In addition, the main spools can be torsionally connected to the winch motor 16 using a main axle. The torque from the winch motor 16 rotates the main axle, which in turn rotates the main spools.

Further, the secondary spools are distributed along a second lateral edge, which is positioned opposite the first lateral edge of the corresponding movable platform frame 9 of the plurality of middle liftable modules 6, as can be seen in FIG. 1 through 22. The secondary spools are preferably aligned with the outer main spools to guide the corresponding hoisting cables from the plurality of hoisting cables 17. Further, the first cable end 18 of each of the plurality of hoisting cables 17 is laterally connected to the main spools. This allows the inner main spools to be directly connected to the corresponding raisable platform 14 by the inner hoisting cables. However, the outer main spools are indirectly connected to the other side of the corresponding raisable platform 14 by the outer hoisting cables via the secondary spools. The outer hoisting cables are routed through the corresponding secondary spools so that the outer hoisting cables are connected to the other side of the corresponding raisable platform 14. In other embodiments, the plurality of spools 20 and the winch motor 16 can be implemented in different arrangements.

Due to the linear movement capabilities of the plurality of middle liftable modules 6, the power distribution subsystem 38 can also be implemented on the plurality of middle liftable modules 6. So, the power distribution subsystem 38 may further comprise a plurality of middle conductor bars 41 and a plurality of middle current collectors 42, as can be seen in FIG. 1 through 22. In the preferred embodiment, each of the plurality of middle conductor bars 41 is similar to the ground conductor bar 39, and the plurality of middle current collectors 42 is similar to the plurality of ground current collectors 40. The plurality of middle conductor bars 41 and the plurality of top current collectors 44 can be implemented as follows: each of the plurality of middle conductor bars 41 is positioned parallel and offset to the corresponding middle track from the plurality of middle tracks 25 to not obstruct the operation of the plurality of middle liftable modules 6. The plurality of middle conductor bars 41 is also mounted within the support frame 1 to secure the plurality of middle conductor bars 41 to the support frame 1.

On the other hand, each of the plurality of middle current collectors 42 is mounted onto the corresponding movable platform frame 9 of the plurality of middle liftable modules 6, as can be seen in FIG. 1 through 22. In other words, each middle liftable module has a corresponding middle current collector. In addition, each of the plurality of middle current collectors 42 is slidably mounted along the corresponding middle conductor bar from the plurality of middle conductor bars 41 so that each middle current collector moves along with the corresponding middle liftable module. Further, the system power source 37 is electrically connected to each of the plurality of middle conductor bars 41, and each of the plurality of middle current collectors 42 is operatively coupled to the corresponding roller mechanism 10 and the corresponding winch mechanism 15 of the plurality of middle liftable modules 6. Each of the plurality of middle current collectors 42 enables the transmission of electrical power from each middle conductor bar to the corresponding roller mechanism 10 and the corresponding winch mechanism 15 using different electrical systems. In other embodiments, different electrical mechanisms can be implemented to provide the necessary electrical power to each of the plurality of middle liftable modules 6.

Due to the liftable capabilities of the plurality of middle liftable modules 6, various safety features are implemented to prevent the raisable platform 14 from falling off the corresponding movable platform frame 9 of the plurality of middle liftable modules 6, as can be seen in FIG. 1 through 22. In some embodiments, each of the plurality of middle liftable modules 6 may further comprise a plurality of motorized safety latches 21 that prevent the vertical movement of the corresponding raisable platform 14 when the corresponding winch mechanism 15 is not in use. The plurality of motorized safety latches 21 can be implemented as follows: the plurality of motorized safety latches 21 is perimetrically distributed about the corresponding raisable platform 14 of the plurality of middle liftable modules 6. The arrangement of the plurality of motorized safety latches 21 helps provide balanced support to the corresponding raisable platform 14. Further, the plurality of motorized safety latches 21 is operatively mounted onto the corresponding raisable platform 14 of the plurality of middle liftable modules 6. In other embodiments, different safety features can be implemented, such as additional safety hoisting cables can be implemented.

As can be seen in FIG. 1 through 22, the plurality of motorized safety latches 21 is used to selectively prevent the vertical movement of the corresponding raisable platform 14 when the corresponding winch mechanism 15 is not in use. For example, each of the plurality of motorized safety latches 21 can be powered with an electrical actuator that rotates the corresponding safety latch into and out of the corresponding movable platform frame 9. When a raisable platform 14 needs to be lowered or raised, the corresponding motorized safety latches are retracted to not obstruct the movement of the raisable platform 14 through the corresponding movable platform frame 9. Alternatively, when a raisable platform 14 is stored away, the corresponding safety latches are deployed to engage the corresponding movable platform frame 9 which prevents the movement of the raisable platform 14 through the corresponding movable platform frame 9. One or more platform sensors can be implemented on each movable platform frame 9 to determine the presence of the corresponding raisable platform 14. The one or more platform sensors can help determine the presence of the corresponding raisable platform 14 in different situations. When the raisable platform 14 is moving, the one or more platform sensors can be used to automatically stop the corresponding winch motor 16 when the raisable platform 14 reaches the corresponding movable platform frame 9. Further, the system controller 36 is electronically connected to each of the plurality of motorized safety latches 21 of the plurality of middle liftable modules 6 to oversee the automated operation of the plurality of motorized safety latches 21. Furthermore, the system power source 37 is electrically connected to each of the plurality of motorized safety latches 21 of the plurality of middle liftable modules 6 to provide the electrical power necessary for the safe and efficient operation of the plurality of motorized safety latches 21.

In the preferred embodiment, the plurality of top liftable modules 7 includes several storage modules that do not need to move along the top track 26 since there are no storage modules above. However, like the plurality of middle liftable modules 6, the storage modules of the plurality of top liftable modules 7 also need to be able to raise and lower the stored items within as necessary. As can be seen in FIG. 1 through 22, each of the plurality of middle liftable modules 6 may comprise a raisable platform 14, a fixed platform frame 22, and a winch mechanism 15. The raisable platform 14 corresponds to the structure that retains the items to be stored within the corresponding top liftable module from the plurality of top liftable modules 7. The fixed platform frame 22 enables the mounting of the corresponding raisable platform 14 to the top track 26 in a fixed location along the top track 26. The winch mechanism 15 enables the corresponding raisable platform 14 to be raised and lowered along the support frame 1. This allows ground access to the plurality of top liftable modules 7 without moving the entire storage module.

In general, each of the plurality of top liftable modules 7 can be implemented as follows: each raisable platform 14 is aligned with the corresponding fixed platform frame 22 of the plurality of top liftable modules 7, as can be seen in FIG. 1 through 22. Each movable platform frame 9 of the plurality of top liftable modules 7 is preferably a square frame with a size large enough to fit on the top track 26, and each raisable platform 14 is a square platform with a size that matches the size of the corresponding square frame. Each raisable platform 14 is also tethered to the corresponding fixed platform frame 22 of the plurality of top liftable modules 7 by the corresponding winch mechanism 15. This way, each raisable platform 14 can raised or lowered as necessary using the corresponding winch mechanism 15. Further, each fixed platform frame 22 of the plurality of top liftable modules 7 is mounted onto the top track 26 to position each top liftable module in a permanent storage space along the top track 26.

Similar to the winch mechanism 15 of the plurality of middle liftable modules 6, each winch mechanism 15 of the plurality of top liftable modules 7 can include different types of mechanisms that allow the controlled lift of the corresponding raisable platform 14, as can be seen in FIG. 1 through 22. In the preferred embodiment, the winch mechanism 15 of each of the plurality of top liftable modules 7 also comprises a winch motor 16, a plurality of hoisting cables 17, and a plurality of spools 20. Each winch mechanism 15 of the plurality of top liftable modules 7 can be implemented as follows: the plurality of spools 20 and the winch motor 16 are perimetrically distributed about the corresponding fixed platform frame 22 of the plurality of top liftable modules 7. The plurality of spools 20 is distributed in such a way that the corresponding raisable platform 14 is evenly hoisted by the winch mechanism 15 to keep the corresponding raisable platform 14 parallel to the ground. In addition, each of the plurality of spools 20 and the winch motor 16 is mounted onto the corresponding fixed platform frame 22 of the plurality of top liftable modules 7 to secure the plurality of spools 20 and the winch motor 16 to the corresponding fixed platform frame 22.

In addition, each of the plurality of spools 20 is torsionally connected to the winch motor 16 so that the torque generated by the winch motor 16 is transmitted to each of the plurality of spools 20, as can be seen in FIG. 1 through 22. Further, the first cable end 18 of each of the plurality of hoisting cables 17 is laterally connected to the corresponding spool from the plurality of spools 20 to secure each hoisting cable to the corresponding spool. On the other hand, the second cable end 19 of each of the plurality of hoisting cables 17 is connected onto the corresponding raisable platform 14 of the plurality of top liftable modules 7 to secure each hoisting cable to the corresponding raisable platform 14. In addition, the system controller 36 is electronically connected to the winch motor 16 of each of the plurality of top liftable modules 7 to oversee the automated operation of each winch motor 16. Furthermore, the system power source 37 is electrically connected to the winch motor 16 of each of the plurality of top liftable modules 7 to provide the electrical power necessary for the operation of each winch motor 16.

Like the winch mechanism 15 of the plurality of middle liftable modules 6, the plurality of spools 20 and the winch motor 16 of each winch mechanism 15 can be implemented on the corresponding top liftable module from the plurality of top liftable modules 7 in various ways, as can be seen in FIG. 1 through 22. In some embodiments, the plurality of spools 20 can be divided into main spools and secondary spools. The main spools preferably correspond to the spools from the plurality of spools 20 that are directly connected to the winch motor 16. The secondary spools help distribute the corresponding hoisting cables from the plurality of hoisting cables 17 to evenly support the raisable platform 14. To do so, the main spools and the winch motor 16 can be distributed along a first lateral edge of the corresponding fixed platform frame 22 of the plurality of top liftable modules 7. The winch motor 16 is preferably centered on the first lateral edge, while the main spools are arranged on both opposite sides of the winch motor 16. In addition, the main spools can be torsionally connected to the winch motor 16 using a main axle. The torque from the winch motor 16 rotates the main axle, which in turn rotates the main spools.

Further, the secondary spools are distributed along a second lateral edge, which is positioned opposite the first lateral edge of the corresponding fixed platform frame 22 of the plurality of top liftable modules 7, as can be seen in FIG. 1 through 22. The secondary spools are preferably aligned with the outer main spools to guide the corresponding hoisting cables from the plurality of hoisting cables 17. Further, the first cable end 18 of each of the plurality of hoisting cables 17 is laterally connected to the main spools. This allows the inner main spools to be directly connected to the corresponding raisable platform 14 by the inner hoisting cables. However, the outer main spools are indirectly connected to the other side of the corresponding raisable platform 14 by the outer hoisting cables via the secondary spools. The outer hoisting cables are routed through the corresponding secondary spools so that the outer hoisting cables are connected to the other side of the corresponding raisable platform 14. In other embodiments, the plurality of spools 20 and the winch motor 16 can be implemented in different arrangements to match different configurations of the winch mechanism 15.

While the plurality of top liftable modules 7 does not require lateral movement along the top track 26, the power distribution subsystem 38 can also be implemented on the plurality of top liftable modules 7. As can be seen in FIG. 1 through 22, the power distribution subsystem 38 may further comprise a top conductor bar 43 and a plurality of top current collectors 44. In the preferred embodiment, the top conductor bar 43 is similar to the ground conductor bar 39, and the plurality of top current collectors 44 is similar to the plurality of ground current collectors 40. The top conductor bar 43 and the plurality of top current collectors 44 can be implemented as follows: the top conductor bar 43 is positioned parallel and offset to the top track 26 to not obstruct the operation of the plurality of top liftable modules 7. The top conductor bar 43 is also mounted within the support frame 1 to secure the top conductor bar 43 to the support frame 1.

On the other hand, each of the plurality of top current collectors 44 is mounted onto the corresponding fixed platform frame 22 of the plurality of top liftable modules 7, as can be seen in FIG. 1 through 22. In other words, each top liftable module has a corresponding top current collector. In addition, each of the plurality of top current collectors 44 is slidably mounted along the top conductor bar 43 to secure the plurality of top current collectors 44 to the top conductor bar 43. Further, the system power source 37 is electrically connected to the top conductor bar 43, and each of the plurality of top current collectors 44 is operatively coupled to the corresponding winch mechanism 15 of the plurality of top liftable modules 7. Each of the plurality of top current collectors 44 enables the transmission of electrical power from each middle the top conductor bar 43 to the corresponding winch mechanism 15 using different electrical systems. In other embodiments, different electrical mechanisms can be implemented to provide the necessary electrical power to each of the plurality of top liftable modules 7.

Due to the liftable capabilities of the plurality of top liftable modules 7, each of the plurality of top liftable modules 7 may also comprise a plurality of motorized safety latches 21 that prevent the vertical movement of the corresponding raisable platform 14 when the corresponding winch mechanism 15 is not in use. As can be seen in FIG. 1 through 22, the plurality of motorized safety latches 21 of the plurality of top liftable modules 7 can be implemented as follows: the plurality of motorized safety latches 21 is perimetrically distributed about the corresponding raisable platform 14 of the plurality of top liftable modules 7. The arrangement of the plurality of motorized safety latches 21 helps provide balanced support to the corresponding raisable platform 14. Further, the plurality of motorized safety latches 21 is operatively mounted onto the corresponding raisable platform 14 of the plurality of top liftable modules 7.

As can be seen in FIG. 1 through 22, the plurality of motorized safety latches 21 is used to selectively prevent the vertical movement of the corresponding raisable platform 14 when the corresponding winch mechanism 15 is not in use. For example, each of the plurality of motorized safety latches 21 can be powered with an electrical actuator that rotates the corresponding safety latch into and out of the corresponding fixed platform frame 22. When a raisable platform 14 needs to be lowered or raised, the corresponding motorized safety latches are retracted to not obstruct the movement of the raisable platform 14 through the corresponding fixed platform frame 22. Alternatively, when a raisable platform 14 is stored away, the corresponding safety latches are deployed to engage the corresponding movable platform frame 9 which prevents the movement of the raisable platform 14 through the corresponding fixed platform frame 22. Further, the system controller 36 is electronically connected to each of the plurality of motorized safety latches 21 of the plurality of top liftable modules 7 to oversee the automated operation of the plurality of motorized safety latches 21. Furthermore, the system power source 37 is electrically connected to each of the plurality of motorized safety latches 21 of the plurality of top liftable modules 7 to provide the electrical power necessary for the operation of the plurality of motorized safety latches 21.

As previously discussed, the present invention's system can be implemented in such a way that the entire operation of the system is automated. The automated operation of the present invention's system requires the tracking of the current operation of each of the storage modules. As can be seen in FIG. 1 through 22, to facilitate the tracking of the plurality of storage modules 4, each of the plurality of support tracks 23 may further comprise a plurality of track sections 27 that helps establish a virtual grid that can be used to track the movement and location of the plurality of storage modules 4 throughout the support frame 1. To implement the virtual grid, the plurality of track sections 27 is distributed along the corresponding support track from the plurality of support tracks 23. The plurality of track sections 27 can be used to delineate the storage spaces available on each support track from the plurality of support tracks 23. The number of track sections available depends on different factors including, but not limited to, the overall system of the support frame 1, the overall size of corresponding storage modules, the overall working length of the corresponding support tracks, etc. Further, an arbitrary track section 28 from the plurality of track sections 27 of an arbitrary support track 30 is vertically aligned with an adjacent track section 29 from the plurality of track sections 27 of an adjacent support track 31. The arbitrary support track 30 and the adjacent support track 31 are any pair of vertically adjacent support tracks from the plurality of support tracks 23.

As can be seen in FIG. 1 through 22, the arrangement of the plurality of track sections 27 allows each of the plurality of track sections 27 to be part of a vertical column of the vertical grid of the support frame 1. This allows the storage spaces throughout the support frame 1 to be properly aligned to facilitate the lowering and lifting of the raisable platform 14 from upper storage modules to prevent accidental collisions. To help track the movement of the plurality of storage modules 4, each of the plurality of support tracks 23 may further comprise a plurality of sensor sets 32. Each of the plurality of sensor sets 32 includes several sensors that can be used to track the location, movement, and/or speed of the target storage module. To do so, the plurality of sensor sets 32 is distributed along the corresponding support track from the plurality of support tracks 23. In addition, each sensor set from the plurality of sensor sets 32 is positioned within a corresponding track section from the plurality of track sections 27. This way, each sensor set can be assigned to a corresponding track section to help track the target storage module positioned or moving through a monitored track section. Further, the system controller 36 is electronically connected to each of the plurality of sensor sets 32 to receive the corresponding sensor data from the plurality of sensor sets 32. Furthermore, the system power source 37 is electrically connected to each of the plurality of sensor sets 32 to provide the electrical power necessary for the safe and efficient operation of the plurality of sensor sets 32.

As previously discussed, each of the plurality of sensor sets 32 includes several sensors that are used to track the location and movement of the target storage module, as can be seen in FIG. 1 through 22. In the preferred embodiment, each sensor set of the plurality of sensor sets 32 includes a pair of sensors that can sense the position of the target storage module during sideways movement. When any sensor of the pair of sensors detects the target storage module, the corresponding roller mechanism 10 is engaged to decelerate. Precise positioning of the pair of sensors is critical for the correct stopping point of the storage modules at the corresponding track section. Further, the pair of sensors can be adjusted to help fine tune the position. The pair of sensors is necessary since accurately stopping the target storage module using a single sensor is not possible. The first sensor of the pair of sensors is used to slow down the target storage module, and the second sensor is used to further slow the target storage module down to a stop. In addition, the pair of sensors can be used to determine the presence of the target storage module on the corresponding track section.

Since the plurality of middle liftable modules 6 can laterally move along the corresponding middle track from the plurality of middle tracks 25, appropriate safety features must be implemented to prevent accidental derailing of the storage modules on the plurality of middle tracks 25, as can be seen in FIG. 1 through 22. In some embodiments, each of the plurality of middle tracks 25 may further comprise a pair of terminal sensors 33, a first pair of track stoppers 34, and a second pair of track stoppers 35. The pair of terminal sensors 33 can be utilized to determine when a middle liftable module reaches a terminal track section of the corresponding middle track. Each pair of terminal sensors 33 is used as a stop switch for each middle track. The pair of terminal sensors 33 cut off the sideways movement of the outermost middle liftable modules to make sure that the plurality of middle liftable modules 6 stay on the corresponding middle track. The first pair of track stoppers 34 and the second pair of track stoppers 35 correspond to physical structures that prevent the plurality of middle liftable modules 6 from falling off the corresponding middle track from the plurality of middle tracks 25. Each pair of track stoppers can also be removed to enable the removal of the corresponding middle liftable modules when necessary.

In the preferred embodiment, the pair of terminal sensors 33, the first pair of track stoppers 34, and the second pair of track stoppers 35 can be implemented as follows: the pair of terminal sensors 33 is terminally positioned opposite each other along the corresponding middle track from the plurality of middle tracks 25, as can be seen in FIG. 1 through 22. In other words, each terminal sensor is positioned on each terminal end of the corresponding middle track. Similarly, the first pair of track stoppers 34 and the second pair of track stoppers 35 are terminally positioned opposite each other along the corresponding middle track from the plurality of middle tracks 25. This way, each pair of track stoppers prevents the derailing of the plurality of middle liftable modules 6 from either end of the corresponding middle track. Further, the pair of terminal sensors 33, the first pair of track stoppers 34, and the second pair of track stoppers 35 are mounted within the support frame 1, adjacent to the corresponding middle track from the plurality of middle tracks 25. This secures each of the pair of terminal sensors 33, the first pair of track stoppers 34, and the second pair of track stoppers 35 to the support frame 1. Further, the system controller 36 is electronically connected to each pair of terminal sensors 33 to receive sensor signals from each pair of terminal sensors 33. Furthermore, the system power source 37 is electrically connected to each pair of terminal sensors 33 to provide the electrical power necessary for the operation of each pair of terminal sensors 33.

Since the plurality of ground modules 5 can also laterally move along the ground track 24, appropriate safety features must be implemented to prevent accidental derailing of the storage modules on the ground track 24. As can be seen in FIG. 1 through 22, the ground track 24 may also comprise a pair of terminal sensors 33, a first pair of track stoppers 34, and a second pair of track stoppers 35. The pair of terminal sensors 33 can be utilized to determine when a ground module reaches a terminal track section of the ground track 24. The first pair of track stoppers 34 and the second pair of track stoppers 35 correspond to physical structures that prevent the plurality of ground modules 5 from falling off the ground track 24.

In the preferred embodiment, the pair of terminal sensors 33, the first pair of track stoppers 34, and the second pair of track stoppers 35 of the ground track 24 can be implemented as follows: the pair of terminal sensors 33 is terminally positioned opposite each other along the ground track 24, as can be seen in FIG. 1 through 22. In other words, each terminal sensor is positioned on each terminal end of the ground track 24. Similarly, the first pair of track stoppers 34 and the second pair of track stoppers 35 are terminally positioned opposite each other along the ground track 24. This way, each pair of track stoppers prevents the derailing of the plurality of ground modules 5 from either end of the ground track 24. Further, the pair of terminal sensors 33, the first pair of track stoppers 34, and the second pair of track stoppers 35 are mounted within the support frame 1, adjacent to the ground track 24. This secures the pair of terminal sensors 33, the first pair of track stoppers 34, and the second pair of track stoppers 35 to the support frame 1. Further, the system controller 36 is electronically connected to each pair of terminal sensors 33 to receive sensor signals from each pair of terminal sensors 33. Furthermore, the system power source 37 is electrically connected to each pair of terminal sensors 33 to provide the electrical power necessary for the operation of each pair of terminal sensors 33.

Due to the automated operation of the present invention's system, safety features that protect the user is also necessary. In some embodiments, the present invention may further comprise a plurality of safety gates 45 that prevents the user from entering the safety frame when any of the plurality of storage modules 4 is moving inside the support frame 1. As can be seen in FIG. 1 through 22, to accommodate the plurality of safety gates 45, the support frame 1 may further comprise a front side 2 and a ground side 3. The front side 2 is preferably the side of the support frame 1 from which the user can access the rented storage module. The ground side 3 corresponds to the side of the support frame 1 that is positioned on the ground. To implement the plurality of safety gates 45, the plurality of safety gates 45 is distributed along the ground side 3, adjacent to the ground track 24. The positioning of the plurality of safety gates 45 adjacent to the ground track 24 is due to the design of the present invention's system where the rented storage module can only be accessed from the ground level. In addition, each of the plurality of safety gates 45 is aligned with a corresponding track section from the plurality of track sections 27 of the ground track 24. This facilitates the automated operation of the present invention's system by designating each storage module to a corresponding storage row and column of the virtual grid of the support frame 1. In addition, each of the plurality of safety gates 45 is externally mounted onto the front side 2 to secure the plurality of safety gates 45 to the support frame 1.

The plurality of safety gates 45 can be provided in different embodiments. For example, the plurality of safety gates 45 can be implemented as mechanical gates that are manually engaged by the user to access the rented storage module. Alternatively, the plurality of safety gates 45 can be implemented as motorized gates driven by electric gear motors mounted onto the safety frame, as can be seen in FIG. 1 through 22. Regardless, the plurality of safety gates 45 can be made of steel or aluminum with variable width and height depending on the system configuration. In the motorized embodiment, the system controller 36 is electronically connected to each of the plurality of safety gates 45 to enable the automatic engagement of each of the plurality of safety gates 45. Further, the system power source 37 is electrically connected to each of the plurality of safety gates 45 to provide the electrical power necessary for the operation of the plurality of safety gates 45. Furthermore, the necessary sensors and other electrical components can be implemented to ensure the safety of the user. For example, sensors can be integrated to prevent each safety gate from being automatically opened when the corresponding safety module is not present.

The self-storage design of the present invention also requires the necessary features to allow the user to engage the system to access the rented storage module. In some embodiments, the present invention may further comprise a plurality of user interfaces 46 corresponding to physical user interfaces that the user can utilize to engage the system, as can be seen in FIG. 1 through 22. Each of the plurality of user interfaces 46 is externally mounted onto the front side 2, adjacent to the corresponding safety gate from the plurality of safety gates 45, so that each user interface can be used to engage a storage module positioned on the storage column coincident with the corresponding safety gate. Further, the system controller 36 is electronically connected to each of the plurality of user interfaces 46 to enable the user to engage the system using any of the plurality of user interfaces 46. Furthermore, the system power source 37 is electrically connected to each of the plurality of user interfaces 46 to provide the electrical power necessary for the operation of the plurality of user interfaces 46.

As previously discussed, each of the plurality of storage modules 4 can retain the desired objects the user wants to store in the rented storage module. Due to the various shapes and sizes of the potential objects that can be stored in the plurality of storage modules 4, the present invention may further comprise a plurality of storage enclosures 47, as can be seen in FIG. 1 through 22. The plurality of storage enclosures 47 corresponds to several light and durable structures that help retain the desired items inside the rented storage module. So, each of the plurality of storage enclosures 47 is mounted onto a corresponding storage module from the plurality of storage modules 4. The plurality of storage enclosures 47 also prevents the stored items from falling off the corresponding storage module when the plurality of storage modules 4 moves inside the support frame 1. This way, personal items and other objects can be safely stored within the storage enclosure of the rented storage module. In some embodiments, each of the plurality of storage enclosures 47 is designed from specifications with a roll up door that can be selectively opened and closed by the user who rented the storage module. Each of the plurality of storage enclosures 47 also includes a mesh ceiling for external light penetration that eliminates the need for artificial lighting. In addition, each of the plurality of storage enclosures 47 can be designed as a modular structure that can be delivered flat-packed for onsite final assembly.

Exemplary Method of Operation of the System of the Present Invention

Figure 19:
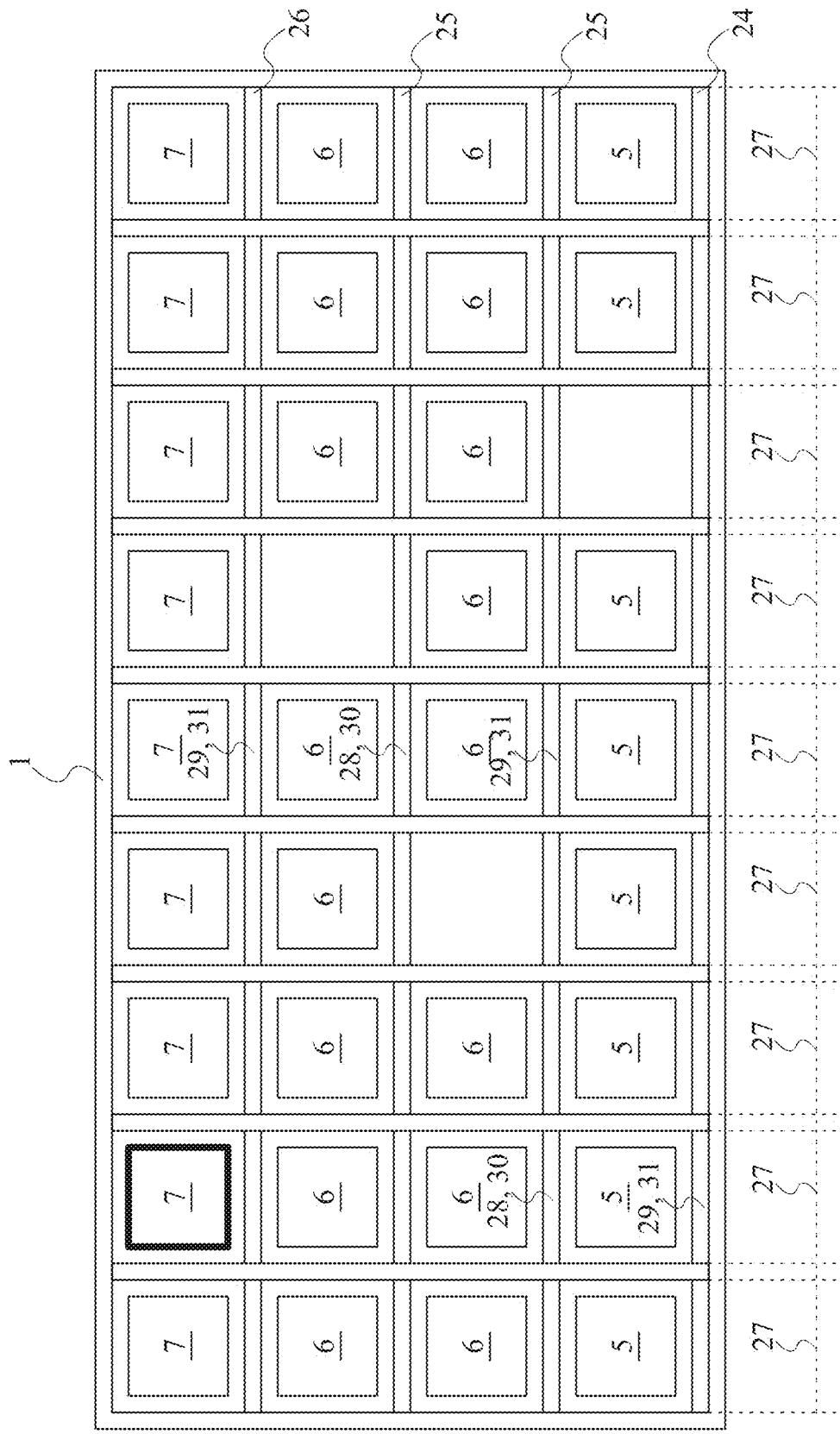
FIG. 19 is a front schematic view showing the virtual grid of the system of the present invention, wherein a target storage module is shown as a top liftable module.
Figure 20:
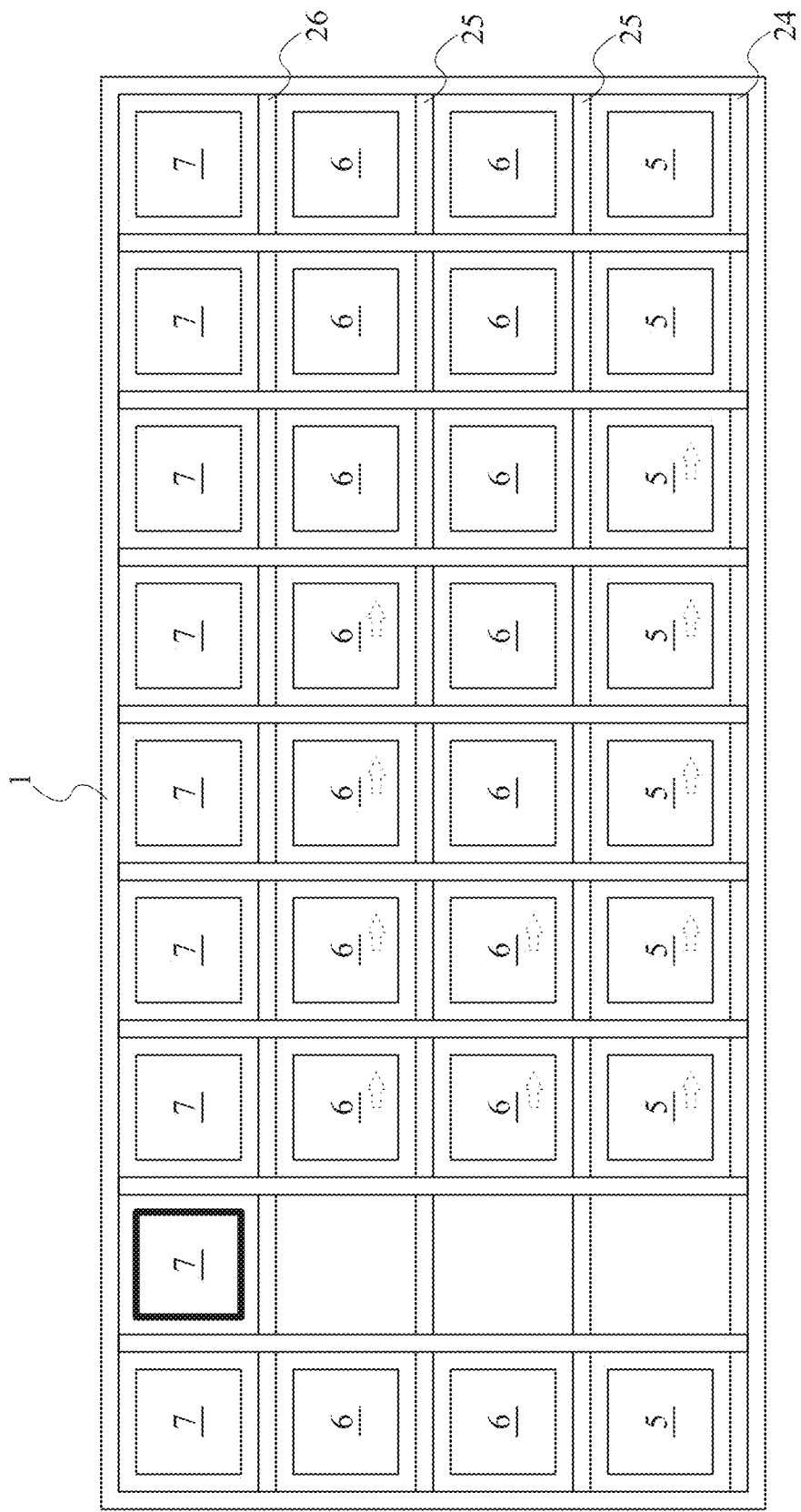
FIG. 20 is a front schematic view showing the virtual grid of the system of the present invention, wherein the storage modules below the target storage module are shown laterally moved to open a vertical path for the target storage module.
Figure 21:
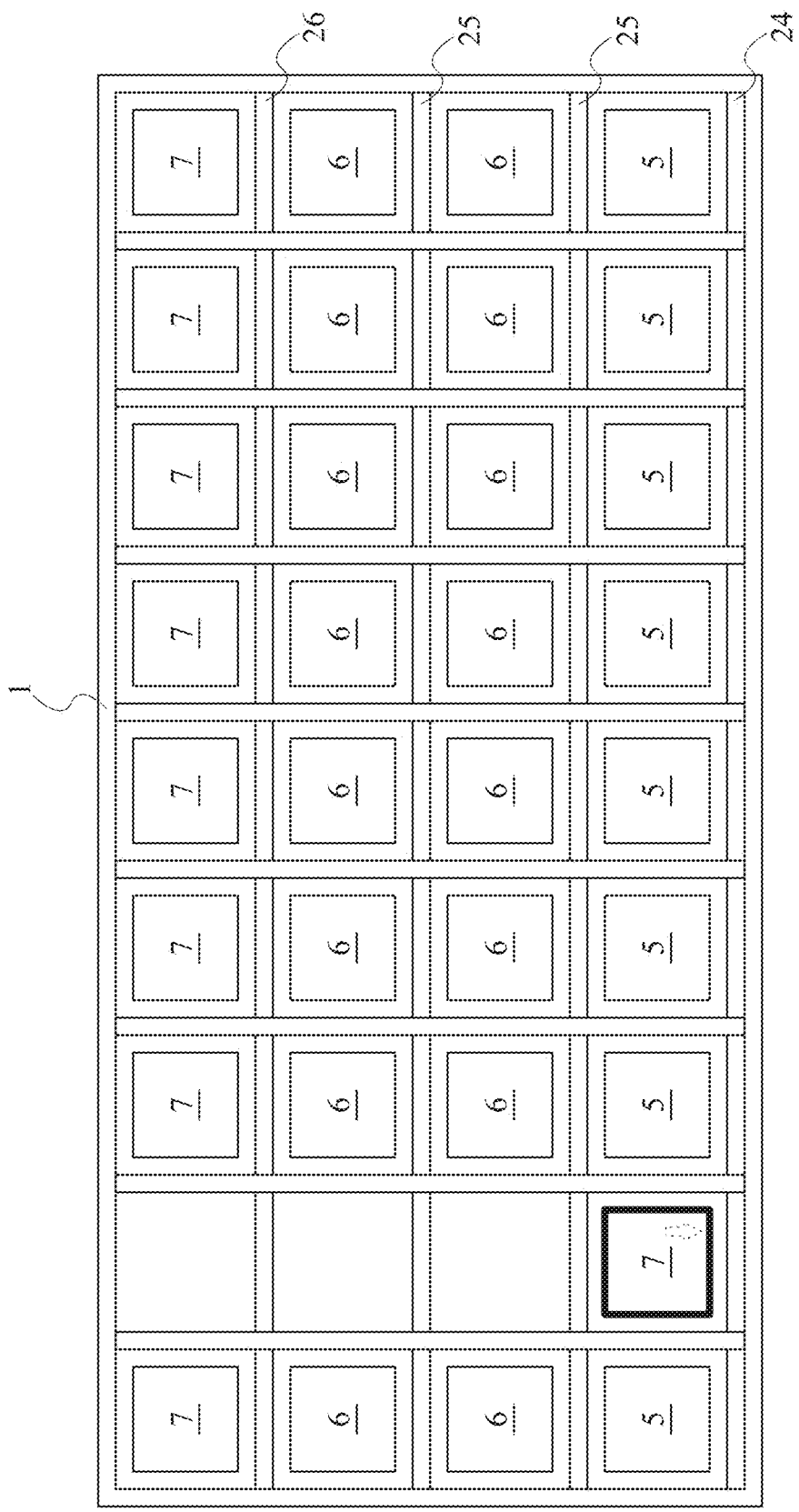
FIG. 21 is a front schematic view showing the virtual grid of the system of the present invention, wherein the target storage module is shown lowered to the ground track for access at the ground level.
Figure 22:
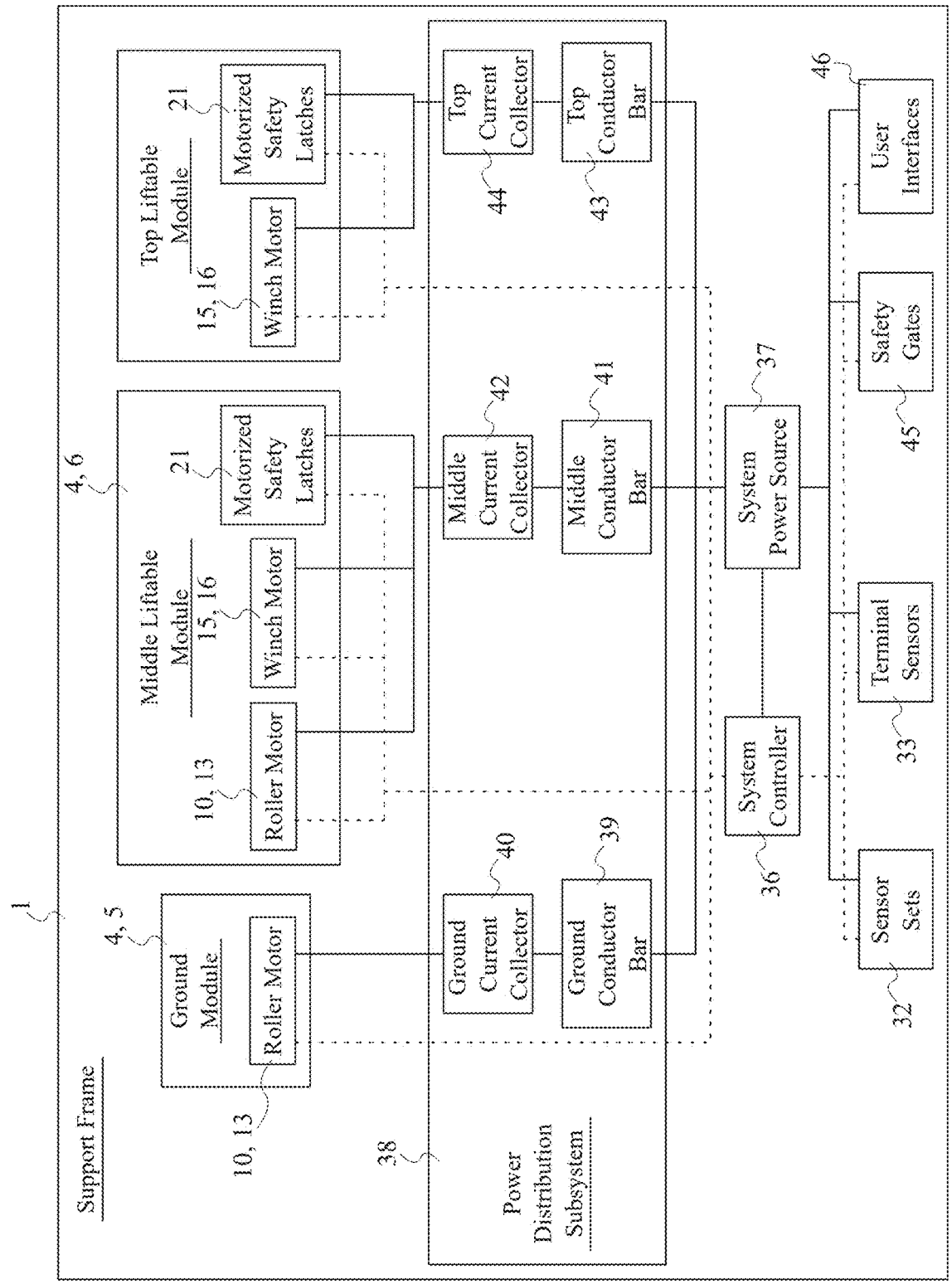
FIG. 22 is a box diagram showing the electrical connections and the electronic connections of the system of the present invention, wherein the electrical connections are shown in solid lines, and wherein the electronic connections are shown in dashed lines.

In an exemplary embodiment, the system of the present invention is designed so that the support frame 1 has four storage rows, designated as L1, L2, L3, and L4. Each storage row has nine track sections that accommodate nine storage modules. So, this embodiment of the support frame 1 can support 36 storage modules. However, only 33 of these have a storage module, leaving three track sections empty to enable the lateral movement of some of the storage modules, as can be seen in FIG. 19 through 21. For example, the ground row, preferably designated as L1, has eight storage modules with an empty track section to enable the lateral movement of the eight ground modules along the ground track 24. Similarly, the two middle rows, designated as L2 and L3, are also equipped with eight storage modules with an empty track section to enable the corresponding middle liftable modules to move along the corresponding middle tracks. Finally, the top row, designated as L4, has nine storage modules since the top liftable modules do not move laterally.

Since each storage row has nine track sections, nine safety gates are implemented so that each storage module can be accessed through a safety gate corresponding to the storage column where the desired storage module is located. To access the rented storage module, the user must only approach the corresponding safety gate and input the necessary user data using the corresponding user interface. In some embodiments, the system of the present invention can also implement a software application that can be installed on a computing device of the user. The software application can be developed for different computing devices to enable the user to engage the present invention's system from the user computing device. For example, the software application can include, but is not limited to, mobile applications, cloud applications, desktop applications, etc. The user computing device can be any of the most common portable computing devices including, but not limited to, smartphones, tablet computers, laptops, wearable computing devices, etc.

Each of the plurality of user interfaces 46 is preferably designed to enable the input of a user code that corresponds to the rented storage space on the support frame 1. Once the user inputs the user code, the user code is relayed from the corresponding user interface to the system controller 36 for validation. Further, a predetermined validation process is performed by the system controller 36 to ensure that the entered user code is a valid code. If the input user code is not validated, a predetermined error message is output by the corresponding user interface to alert the user about the failure to validate the entered user code. If the entered user code is validated, the system of the present invention is engaged to move the rented storage module to the corresponding safety gate to grant access to the stored items. Once the rented storage module is moved to the track section adjacent to the corresponding track section, the corresponding safety gate is opened to enable the user to access the rented storage module as necessary. Further, the corresponding safety gate is only opened when the rented storage module is positioned on the adjacent track section 29.

The plurality of sensor sets 32 can be utilized in different control methodologies to facilitate the automated operation of the present invention's system. In the preferred embodiment, to determine the presence of the target storage module on the corresponding storage track, the sensor signals from the sensor set on the corresponding storage track are used. If the corresponding pair of sensors detect both detect the presence of the target storage module, the system controller 36 determines that the target storage module is already in the correct position and is stationary. This process can be utilized to determine if the storage modules below the target storage module need to move to leave space for the raisable platform 14 of the target storage module to be lowered to the ground track 24 for access to the user. If a storage module needs to be moved, the at least one roller motor 13 of the corresponding storage module is engaged to move the corresponding movable platform frame 9. The storage module is laterally moved towards the empty track section on the corresponding support track. If there are other storage modules blocking the path, the other storage modules are also moved to provide space.

Once the storage module is moved from the corresponding track section, the pair of sensors on the track section fail to detect the presence of the storage module. The system controller 36 can then determine that the track section is empty to allow the raisable platform 14 of the target storage module to be lowered to the ground track 24. In the meantime, the moved storage module transitioning into the empty track section is safely moved by the system controller 36. As previously discussed, the moved storage module is first slowed down when the first sensor of the empty track section is engaged. Once the second sensor of the empty track section is also engaged, the moved storage module is slowed down to a stop in the empty track section. Once both sensors detect the presence of the moved storage module in the previously empty track section, the system controller 36 can determine that the moved storage module has been safely moved into the previously empty track section. Thus, the system controller 36 can engage the winch motor 16 of the target storage module to lower the raisable platform 14.

This process can be performed for any storage module positioned below the target storage module. For example, if the target storage module is any middle liftable module from the plurality of middle liftable modules 6, the ground module and any lower middle liftable module below are moved to provide space for the target middle liftable module. As can be seen in FIG. 19 through 21, if the target storage module is any top liftable module from the plurality of top liftable modules 7, the middle liftable modules and the ground module below are moved to provide space for the target top liftable module. Once the path is open for the raisable platform 14 of the target storage module to be lowered, the system controller 36 can proceed to safely engaged the corresponding winch motor 16. Further, the one or more platform sensors can be used to facilitate the automatic operation of the present invention's system. If the one or more platform sensors detect the presence of the raisable platform 14, the system controller 36 can move corresponding movable platform if necessary. Otherwise, the system controller 36 would not move the corresponding movable platform.

Although the invention has been explained in relation to its preferred embodiment, it is to be understood that many other possible modifications and variations can be made without departing from the spirit and scope of the invention.

What is claimed is:
1. An automated self-storage system comprising:
   a support frame;
   a plurality of storage modules;
   a plurality of support tracks;
   a system controller;
   a system power source;
   the plurality of storage modules comprising a plurality of ground modules, a plurality of middle liftable modules, and a plurality of top liftable modules;
   the plurality of support tracks comprising a ground track, a plurality of middle tracks, and a top track;
   the plurality of support tracks being vertically distributed along the support frame;
   the plurality of support tracks being positioned parallel to each other;
   the plurality of support tracks being mounted within the support frame;
   the ground track being positioned opposite the top track across the plurality of middle tracks;
   each of the plurality of storage modules being distributed along a corresponding support track from the plurality of support tracks;
   each of the plurality of ground modules being movably mounted along the ground track;

each of the plurality of middle liftable modules being
movably mounted along a corresponding middle track
from the plurality of middle tracks;
each of the plurality of top liftable modules being
mounted onto the top track;
the system controller being electronically connected to
each storage module from the plurality of storage
modules; and
the system power source being electrically connected to
each storage module from the plurality of storage
modules.

2. The system as claimed in claim 1 further comprising:
a plurality of storage enclosures; and
each of the plurality of storage enclosures being mounted
onto a corresponding storage module from the plurality
of storage modules.

3. The system as claimed in claim 1 further comprising:
a plurality of safety gates;
the support frame further comprising a front side and a
ground side;
the ground track comprising a plurality of track sections;
the plurality of track sections being distributed along the
ground track;
the plurality of safety gates being distributed along the
ground side, adjacent to the ground track;
each of the plurality of safety gates being aligned with a
corresponding track section from the plurality of track
sections of the ground track; and
each of the plurality of safety gates being externally
mounted onto the front side.

4. The system as claimed in claim 3 further comprising:
a plurality of user interfaces;
each of the plurality of user interfaces being externally
mounted onto the front side, adjacent to a corresponding safety gate from the plurality of safety gates;
the system controller being electronically connected to
each of the plurality of user interfaces; and
the system power source being electrically connected to
each of the plurality of user interfaces.

5. The system as claimed in claim 1 further comprising:
each of the plurality of ground modules comprising a
fixed platform, a movable platform frame, and a roller
mechanism;
each fixed platform being aligned with a corresponding
movable platform frame of the plurality of ground
modules;
each fixed platform being mounted onto the corresponding movable platform frame of the plurality of ground
modules; and
each movable platform frame of the plurality of ground
modules being rollably mounted onto the ground track
by a corresponding roller mechanism.

6. The system as claimed in claim 5 further comprising:
the roller mechanism of each of the plurality of ground
modules comprising a plurality of rollers and at least
one roller motor;
the plurality of rollers comprising at least one drive roller;
the plurality of rollers being perimetrically distributed
about the corresponding movable platform frame of the
plurality of ground modules;
each of the plurality of rollers being rotatably mounted
onto the corresponding movable platform frame of the
plurality of ground modules;
each movable platform frame of the plurality of ground
modules being rollably mounted onto the ground track
by a corresponding rollers from the plurality of rollers;

the at least one roller motor being mounted onto the
corresponding movable platform frame of the plurality
of ground modules;
the at least one roller motor being torsionally connected to
the at least one drive roller of the corresponding roller
mechanism;
the system controller being electronically connected to the
at least one roller motor of each roller mechanism; and
the system power source being electrically connected to
the at least one roller motor of each roller mechanism.

7. The system as claimed in claim 5 further comprising:
a power distribution subsystem;
the power distribution subsystem comprising a ground
conductor bar and a plurality of ground current collectors;
the ground conductor bar being positioned parallel and
offset to the ground track;
the ground conductor bar being mounted within the
support frame;
each of the plurality of ground current collectors being
mounted onto the corresponding movable platform
frame of the plurality of ground modules;
each of the plurality of ground current collectors being
slidably mounted along the ground conductor bar;
the system power source being electrically connected to
ground conductor bar; and
each of the plurality of ground current collectors being
operatively coupled to the corresponding roller mechanism of the plurality of ground modules, wherein each
of the plurality of ground current collectors enables the
transmission of electrical power from the ground conductor bar to the corresponding roller mechanism.

8. The system as claimed in claim 1 further comprising:
each of the plurality of middle liftable modules comprising a raisable platform, a movable platform frame, a
roller mechanism, and a winch mechanism;
each raisable platform being aligned with the corresponding movable platform frame of the plurality of middle
liftable modules;
each raisable platform being tethered to the corresponding
movable platform frame of the plurality of middle
liftable modules by a corresponding winch mechanism;
and
each movable platform frame of the plurality of middle
liftable modules being rollably mounted onto the corresponding middle track from the plurality of middle
tracks by the corresponding roller mechanism.

9. The system as claimed in claim 8 further comprising:
the roller mechanism of each of the plurality of middle
liftable modules comprising a plurality of rollers and at
least one roller motor;
the plurality of rollers comprising at least one drive roller;
the plurality of rollers being perimetrically distributed
about the corresponding movable platform frame of the
plurality of middle liftable modules;
the plurality of rollers being rotatably mounted onto the
corresponding movable platform frame of the plurality
of middle liftable modules;
each movable platform frame of the plurality of middle
liftable modules being rollably mounted onto the corresponding middle track from the plurality of middle
tracks by the corresponding rollers from the plurality of
rollers;
the at least one roller motor being mounted onto the
corresponding movable platform frame of the plurality
of middle liftable modules;

the at least one roller motor being torsionally connected to the at least one drive roller of the corresponding roller mechanism;
the system controller being electronically connected to the at least one roller motor of each roller mechanism; and
the system power source being electrically connected to the at least one roller motor of each roller mechanism.

10. The system as claimed in claim 8 further comprising:
the winch mechanism of each of the plurality of middle liftable modules comprising a winch motor, a plurality of hoisting cables, and a plurality of spools;
each of the plurality of hoisting cables comprising a first cable end and a second cable end;
the plurality of spools and the winch motor being perimetrically distributed about the corresponding movable platform frame of the plurality of middle liftable modules;
each of the plurality of spools and the winch motor being mounted onto the corresponding movable platform frame of the plurality of middle liftable modules;
each of the plurality of spools being torsionally connected to the winch motor;
the first cable end of each of the plurality of hoisting cables being laterally connected to a corresponding spool from the plurality of spools;
the second cable end of each of the plurality of hoisting cables being connected onto a corresponding raisable platform of the plurality of middle liftable modules;
the system controller being electronically connected to the winch motor of each of the plurality of middle liftable modules; and
the system power source being electrically connected to the winch motor of each of the plurality of middle liftable modules.

11. The system as claimed in claim 8 further comprising:
a power distribution subsystem;
the power distribution subsystem comprising a plurality of middle conductor bars and a plurality of middle current collectors;
each of the plurality of middle conductor bars being positioned parallel and offset to the corresponding middle track from the plurality of middle tracks;
each of the plurality of middle conductor bars being mounted within the support frame;
each of the plurality of middle current collectors being mounted onto the corresponding movable platform frame of the plurality of middle liftable modules;
each of the plurality of middle current collectors being slidably mounted along a corresponding middle conductor bar from the plurality of middle conductor bars;
the system power source being electrically connected to each of the plurality of middle conductor bars; and
each of the plurality of middle current collectors being operatively coupled to the corresponding roller mechanism and the corresponding winch mechanism of the plurality of middle liftable modules, wherein each of the plurality of middle current collectors enables the transmission of electrical power from each middle conductor bar to the corresponding roller mechanism and the corresponding winch mechanism.

12. The system as claimed in claim 8 further comprising:
each of the plurality of middle liftable modules further comprising a plurality of motorized safety latches;
the plurality of motorized safety latches being perimetrically distributed about the corresponding raisable platform of the plurality of middle liftable modules;
the plurality of motorized safety latches being operatively mounted onto the corresponding raisable platform of the plurality of middle liftable modules, wherein the plurality of motorized safety latches is used to selectively prevent the vertical movement of the corresponding raisable platform;
the system controller being electronically connected to each of the plurality of motorized safety latches of the plurality of middle liftable modules; and
the system power source being electrically connected to each of the plurality of motorized safety latches of the plurality of middle liftable modules.

13. The system as claimed in claim 1 further comprising:
each of the plurality of top liftable modules comprising a raisable platform, a fixed platform frame, and a winch mechanism;
the raisable platform being aligned with a corresponding fixed platform frame of the plurality of top liftable modules;
the raisable platform being tethered to the corresponding fixed platform frame by the corresponding winch mechanism; and
each fixed platform frame of the plurality of top liftable modules being mounted onto the top track.

14. The system as claimed in claim 13 further comprising:
the winch mechanism of each of the plurality of top liftable modules comprising a winch motor, a plurality of hoisting cables, and a plurality of spools;
each of the plurality of hoisting cables comprising a first cable end and a second cable end;
the plurality of spools and the winch motor being perimetrically distributed about the corresponding fixed platform frame of the plurality of top liftable modules;
each of the plurality of spools and the winch motor being mounted onto the corresponding fixed platform frame of the plurality of top liftable modules;
each of the plurality of spools being torsionally connected to the winch motor;
the first cable end of each of the plurality of hoisting cables being laterally connected to a corresponding spool from the plurality of spools;
the second cable end of each of the plurality of hoisting cables being connected onto the corresponding raisable platform of the plurality of top liftable modules;
the system controller being electronically connected to the winch motor of each of the plurality of top liftable modules; and
the system power source being electrically connected to the winch motor of each of the plurality of top liftable modules.

15. The system as claimed in claim 13 further comprising:
a power distribution subsystem;
the power distribution subsystem comprising a top conductor bar and a plurality of top current collectors;
the top conductor bar being positioned parallel and offset to the top track;
the top conductor bar being mounted within the support frame;
each of the plurality of top current collectors being mounted onto the corresponding fixed platform frame of the plurality of top liftable modules;
each of the plurality of top current collectors being slidably mounted along the top conductor;
the system power source being electrically connected to top conductor bar; and
each of the plurality of top current collectors being operatively coupled to the corresponding winch mechanism of the plurality of top liftable modules, wherein each of the plurality of top current collectors enables the transmission of electrical power from the top conductor bar to the corresponding winch mechanism.

16. The system as claimed in claim 13 further comprising:

each of the plurality of top liftable modules further comprising a plurality of motorized safety latches;

the plurality of motorized safety latches being perimetrically distributed about the corresponding fixed platform frame of the plurality of top liftable modules;

the plurality of motorized safety latches being operatively mounted onto the corresponding raisable platform of the plurality of top liftable modules, wherein the plurality of motorized safety latches is used to selectively prevent the vertical movement of the corresponding raisable platform;

the system controller being electronically connected to each of the plurality of motorized safety latches of the plurality of top liftable modules; and the system power source being electrically connected to each of the plurality of motorized safety latches of the plurality of top liftable modules.

17. The system as claimed in claim 1 further comprising:

each of the plurality of support tracks further comprising a plurality of track sections;

the plurality of track sections being distributed along a corresponding support track from the plurality of support tracks; and an arbitrary track section from the plurality of track sections of an arbitrary support track being vertically aligned with an adjacent track section from the plurality of track sections of an adjacent support track, wherein the arbitrary support track and the adjacent support track are any pair of vertically adjacent support tracks from the plurality of support tracks.

18. The system as claimed in claim 17 further comprising:

each of the plurality of support tracks further comprising a plurality of sensor sets;

the plurality of sensor sets being distributed along the corresponding support track from the plurality of support tracks;

each sensor set from the plurality of sensor sets being positioned within a corresponding track section from the plurality of track sections;

the system controller being electronically connected to each of the plurality of sensor sets; and the system power source being electrically connected to each of the plurality of sensor sets.

19. The system as claimed in claim 17 further comprising:

each of the plurality of middle tracks further comprising a pair of terminal sensors, a first pair of track stoppers, and a second pair of track stoppers;

the pair of terminal sensors being terminally positioned opposite each other along a corresponding middle track from the plurality of middle tracks;

the first pair of track stoppers and the second pair of track stoppers being terminally positioned opposite each other along the corresponding middle track from the plurality of middle tracks;

the pair of terminal sensors, the first pair of track stoppers, and the second pair of track stoppers being mounted within the support frame, adjacent to the corresponding middle track from the plurality of middle tracks;

the system controller being electronically connected to each pair of terminal sensors; and the system power source being electrically connected to each pair of terminal sensors.

20. The system as claimed in claim 17 further comprising:

the ground track further comprising a pair of terminal sensors, a first pair of track stoppers, and a second pair of track stoppers;

the pair of terminal sensors being terminally positioned opposite to each other along the ground track;

the first pair of track stoppers and the second pair of track stoppers being terminally positioned opposite to each other along the ground track;

the pair of terminal sensors, the first pair of track stoppers, and the second pair of track stoppers each being mounted within the support frame, adjacent to the ground track;

the system controller being electronically connected to each pair of terminal sensors; and the system power source being electrically connected to each pair of terminal sensors.

* * * * *